United States Patent
Xu

(10) Patent No.: US 11,758,399 B2
(45) Date of Patent: Sep. 12, 2023

(54) WIRELESS LOCAL AREA NETWORK CONFIGURATION USING PROBE REQUEST FRAME HAVING AUTHENTICATION INFORMATION

(71) Applicant: HUAWEI TECHNOLOGIES CO., LTD., Guangdong (CN)

(72) Inventor: Jianfeng Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 708 days.

(21) Appl. No.: 16/616,210

(22) PCT Filed: May 25, 2017

(86) PCT No.: PCT/CN2017/085979
§ 371 (c)(1),
(2) Date: Nov. 22, 2019

(87) PCT Pub. No.: WO2018/214114
PCT Pub. Date: Nov. 29, 2018

(65) Prior Publication Data
US 2020/0178079 A1  Jun. 4, 2020

(51) Int. Cl.
*H04L 29/06* (2006.01)
*H04W 12/06* (2021.01)
(Continued)

(52) U.S. Cl.
CPC ......... *H04W 12/068* (2021.01); *H04L 63/083* (2013.01); *H04W 12/033* (2021.01);
(Continued)

(58) Field of Classification Search
CPC . H04W 12/068; H04W 12/50; H04W 12/069; H04W 12/033; H04W 12/06;
(Continued)

(56) References Cited

U.S. PATENT DOCUMENTS 10,869,345 B1 * 12/2020 Huang ................. H04W 12/65
2012/0102543 A1 * 4/2012 Kohli ..................... H04L 63/20
726/1
(Continued)

FOREIGN PATENT DOCUMENTS

CN  103139775 A  * 6/2013 ............ H04W 48/08
CN  103414993 A  * 11/2013 ............ H04W 48/08
(Continued)

OTHER PUBLICATIONS

XP058200438 Janne Lindqvist et al.,"Privacy-Preserving 802.11 Access-Point Discovery",WiSec 09, Mar. 16-18, 2009,total 8 pages.

*Primary Examiner* — Haresh N Patel
(74) *Attorney, Agent, or Firm* — WOMBLE BOND DICKINSON (US) LLP

(57) ABSTRACT

This application provides a wireless local area network configuration method and a device, and relates to the field of communications technologies, so as to increase a success rate of configuring authentication information of a home wireless local area network for a home device, and improve efficiency in connecting the home device to the home wireless local area network. A specific solution is as follows: A terminal obtains authentication information of a first wireless local area network, configures an SSID of the first wireless local area network as a hidden SSID, and sends at least one first probe request frame, where the first probe request frame carries at least a part of the authentication information of the first wireless local area network.

17 Claims, 26 Drawing Sheets

(51) Int. Cl.
    *H04L 9/40* (2022.01)
    *H04W 48/14* (2009.01)
    *H04W 48/16* (2009.01)
    *H04W 12/033* (2021.01)
    *H04W 12/50* (2021.01)
    *H04W 12/069* (2021.01)
    *H04L 29/08* (2006.01)
    *H04W 84/12* (2009.01)

(52) U.S. Cl.
    CPC ......... *H04W 12/06* (2013.01); *H04W 12/069* (2021.01); *H04W 12/50* (2021.01); *H04W 48/14* (2013.01); *H04W 48/16* (2013.01); *H04W 84/12* (2013.01)

(58) Field of Classification Search
    CPC ..... H04W 48/14; H04W 48/16; H04W 84/12; H04L 63/083
    USPC .............................................................. 726/7
    See application file for complete search history.

(56) References Cited

U.S. PATENT DOCUMENTS

| | | | |
|---|---|---|---|
| 2013/0024685 A1 | 1/2013 | Kolavennu et al. | |
| 2014/0007209 A1* | 1/2014 | Zucker | H04W 12/50 726/7 |
| 2015/0139025 A1 | 5/2015 | Lee et al. | |
| 2016/0249287 A1 | 8/2016 | Xie et al. | |
| 2017/0171809 A1* | 6/2017 | Crowe | H04W 48/16 |
| 2018/0199265 A1 | 7/2018 | Liu et al. | |

FOREIGN PATENT DOCUMENTS

| | | | | |
|---|---|---|---|---|
| CN | 103607751 A | | 2/2014 | |
| CN | 104302015 A | | 1/2015 | |
| CN | 104618900 A | | 5/2015 | |
| CN | 104619040 A | * | 5/2015 | ............ H04W 48/08 |
| CN | 104640231 A | | 5/2015 | |
| CN | 104703176 A | | 6/2015 | |
| CN | 105188058 A | | 12/2015 | |
| CN | 105809163 A | | 7/2016 | |
| CN | 106455001 A | | 2/2017 | |
| CN | 108307529 A | * | 7/2018 | ............ H04W 48/08 |
| GB | 2507929 A | * | 5/2014 | ............. F25D 29/00 |
| JP | 2012070220 A | | 4/2012 | |
| JP | 2017508419 A | | 3/2017 | |
| VN | 10027142 B | * | 1/2021 | ........ H04W 28/0215 |
| WO | WO-2016070331 A | * | 5/2016 | ............ H04W 48/08 |
| WO | 2017041675 A1 | | 3/2017 | |

\* cited by examiner

CONT. FROM FIG. 15A

CONT. FROM FIG. 15A

S903'. At least two first probe request frames, where each of the at least two first probe request frames carries one piece of segmental authentication information →

S905. After receiving one first probe request frame, obtain at least a part of the authentication information of the first wireless local area network carried in the first probe request frame S906'. Parse SSID fields of the at least two first probe request frames, and reassemble, based on a segment identifier parsed out from each SSID field, the segmental authentication information carried in the SSID fields of the at least two first probe request frames, to obtain the authentication information of the first wireless local area network S907. Connect to the first wireless local area network by using the authentication information of the first wireless local area network

FIG. 15B

//WIRELESS LOCAL AREA NETWORK
CONFIGURATION USING PROBE REQUEST
FRAME HAVING AUTHENTICATION
INFORMATION

CROSS-REFERENCE TO RELATED
APPLICATIONS

This application is a National Stage of International Patent Application No. PCT/CN2017/085979 filed on May 25, 2017, which is hereby incorporated by reference in its entirety.

TECHNICAL FIELD

This application relates to the field of communications technologies, and in particular, to a wireless local area network configuration method and a device.

BACKGROUND

With development of electronic information technologies, smart household gradually enters people's daily lives. In smart household, a house may be used as a platform and a wireless local area network such as a Wireless Fidelity (Wireless Fidelity, Wi-Fi) network is used to integrate and control home devices related to home life, to improve home safety, convenience, and comfort.

However, the home devices are limited by their physical forms (for example, generally, no display or input components are disposed on devices such as a table lamp and a socket), and a service set identifier (SSID) (denoted as an SSID-1) and a Wi-Fi password (denoted as a key-1) of a home Wi-Fi network (denoted as a net-1) cannot be conveniently entered. Therefore, some home devices can connect to the net-1 only after receiving the SSID-1 and the key-1 that are sent by another communications terminal (such as a mobile phone).

In the prior art, the foregoing home device may receive, in the following manner, the SSID-1 and the key-1 that are sent by the mobile phone, and then connect to the home Wi-Fi network (namely, the net-1) by using the received SSID-1 and key-1: The home device may serve as an access point (AP) to provide an ad-hoc network (denoted as a net-2), and a user may operate the mobile phone to connect the mobile phone to the net-2 by using an SSID (denoted as an SSID-2) and a Wi-Fi password (denoted as a key-2) that are preset and provided on the home device. Then, the mobile phone may send the SSID-1 and the key-1 to the home device by using the net-2.

However, in the foregoing manner, to complete Wi-Fi network configuration for a plurality of home devices, the user needs to execute, for each home device by operating the mobile phone, a process of "connecting the mobile phone to the ad-hoc network provided by the home device and sending the SSID-1 and the key-1 to the home device by using the ad-hoc network to which the mobile phone is connected". As a result, a configuration time is relatively long.

To simplify a Wi-Fi network configuration process of the home device and reduce the configuration time, the plurality of home devices may be controlled to be in a sniffer listening mode, and listen to a user datagram protocol (UDP) packet that is sent by the mobile phone and that carries the SSID-1 and the key-1, to obtain the SSID-1 and the key-1. The mobile phone may send the UDP packet in a multicast, broadcast, or unicast manner on an operating channel of the net-1.

However, the mobile phone usually prefers to transmit the multicast, broadcast, or unicast UDP packet by using a Wi-Fi high-speed protocol, while communications modules of most home devices do not support data transmission that is based on the Wi-Fi high-speed protocol. Therefore, the home device cannot obtain the SSID-1 and the key-1 because the home device fails to receive the UDP packet, and therefore cannot connect to the home Wi-Fi network. In addition, the UDP packet sent by the mobile phone by using the Wi-Fi high-speed protocol needs to be forwarded by a wireless router, and this may exert impact on another data service on the wireless router and affect transmission of the another data service.

SUMMARY

This application provides a wireless local area network configuration method and a device, to increase a success rate of configuring authentication information of a home wireless local area network for a home device, and improve efficiency in connecting the home device to the home wireless local area network.

To achieve the foregoing objective, the following technical solutions are used in this application:

According to a first aspect, this application provides a wireless local area network configuration method. The method is applied to a terminal, and the method includes: obtaining authentication information of a first wireless local area network, where the authentication information of the first wireless local area network includes an SSID and an access password of the first wireless local area network; configuring the SSID of the first wireless local area network as a hidden SSID; and sending at least one first probe request frame, where the first probe request frame carries at least a part of the authentication information of the first wireless local area network.

According to the wireless local area network configuration method provided in this application, in a Wi-Fi standard, for a wireless local area network with a hidden SSID, a probe request frame may carry the SSID of the wireless local area network. Based on this stipulation in the Wi-Fi standard, the terminal may configure the SSID of the first wireless local area network as the hidden SSID after obtaining the authentication information of the first wireless local area network. In this case, the terminal may send a probe request frame (namely, a probe request frame or the first probe request frame) carrying the authentication information of the first wireless local area network.

The probe request frame sent by the terminal does not need to be forwarded by a wireless router, so that there is no impact on another data service on the wireless router. In addition, the probe request frame is a Wi-Fi management frame, and a Wi-Fi module in any home device can listen to and receive the probe request frame. This can ensure that a home device can receive the probe request frame, and therefore can obtain the SSID and the access password that are carried in the probe request frame, so as to connect to the first wireless local area network by using the SSID and the access password. In other words, this application can increase a success rate of configuring authentication information of a home wireless local area network for a home device, and improve efficiency in connecting the home device to the home wireless local area network.

With reference to the first aspect, in a first possible implementation, the first probe request frame is not responded to by an access point (AP) that establishes the first wireless local area network. Generally, after a station (STA) (namely, the terminal) sends a probe request frame, if the AP receives the probe request frame, when determining that an SSID corresponding to the AP is the same as an SSID carried in the probe request frame, the AP may reply to the STA with a probe response frame in response to the probe request. The first probe request in this application is not intended to detect the first wireless local area network, but is intended to transmit the authentication information of the first wireless local area network to the home device. Therefore, the first probe request is not responded to by the AP that establishes the first wireless local area network.

With reference to the first aspect or the first possible implementation, in a second possible implementation, an SSID field of the first probe request frame carries the at least a part of the authentication information of the first wireless local area network. Generally, when an SSID of a wireless local area network is a hidden SSID, an SSID field of a probe request frame for detecting the wireless local area network carries the SSID of the wireless local area network. However, in this application, the SSID field of the probe request frame may carry the at least a part of the authentication information of the first wireless local area network.

With reference to any one of the first aspect or the foregoing possible implementations, in a third possible implementation, before the "sending the at least one probe request frame", the method in this application further includes: dividing the authentication information of the first wireless local area network into at least two parts, to obtain at least two pieces of segmental authentication information, where the at least one first probe request frame may include at least two first probe request frames, each of the at least two first probe request frames includes one piece of segmental authentication information, and the at least two first probe request frames are in a one-to-one correspondence with the at least two pieces of segmental authentication information.

It can be understood that an SSID field of one first probe request frame may carry a limited amount of data. For example, an SSID field of one first probe request frame can carry a maximum of 32-byte data, but the authentication information of the first wireless local area network may include more than 32 bytes. Based on this case, the terminal may divide the authentication information of the first wireless local area network into the at least two parts, and add the obtained at least two pieces of segmental authentication information to SSID fields of the at least two first probe request frames, respectively.

With reference to any one of the first aspect or the foregoing possible implementations, in a fourth possible implementation, the terminal may receive the authentication information of the first wireless local area network entered by a user in a home app. Specifically, before the "obtaining authentication information of a first wireless local area network", the method in this application further includes: displaying a display interface of a first application, where the display interface of the first application includes an authentication information entry window. The "obtaining authentication information of a first wireless local area network" may include: obtaining the authentication information of the first wireless local area network entered by the user in the authentication information entry window.

With reference to the fourth possible implementation, in a fifth possible implementation, the terminal may be an Android terminal.

With reference to the fourth possible implementation, in a sixth possible implementation, the terminal may be an Internetwork Operating System (IOS) terminal. Because of a compatibility problem of an IOS operating system, the IOS terminal may not be able to directly use the authentication information of the first wireless local area network. Based on this case, after obtaining the authentication information of the first wireless local area network, the terminal may import, into the IOS system of the terminal, an IOS description file including the authentication information of the first wireless local area network, so that the IOS terminal can use the authentication information of the first wireless local area network. Specifically, after the "obtaining the authentication information of the first wireless local area network entered by the user in the authentication information entry window", and before the "sending at least one first probe request frame", the method in this application further includes: adding the authentication information of the first wireless local area network to the IOS description file; displaying a description file installation interface of the IOS terminal; and obtaining a first input of the user on the description file installation interface, and importing the IOS description file into the IOS system of the IOS terminal in response to the first input. For example, the IOS description file may be a file whose name is suffixed with ".mobileco".

According to a second aspect, this application provides a terminal, and the terminal includes an obtaining module, a configuration module, and a sending module. The obtaining module is configured to obtain authentication information of a first wireless local area network, where the authentication information of the first wireless local area network includes an SSID and an access password of the first wireless local area network. The configuration module is configured to configure the SSID of the first wireless local area network as a hidden SSID. The sending module is configured to send at least one first probe request frame, where the first probe request frame carries at least a part of the authentication information of the first wireless local area network.

With reference to the second aspect, in a first possible implementation, the first probe request sent by the sending module is not responded to by an access point that establishes the first wireless local area network.

With reference to the second aspect or the first possible implementation, in a second possible implementation, an SSID field of the first probe request frame sent by the sending module carries the at least a part of the authentication information of the first wireless local area network.

With reference to any one of the second aspect or the possible implementations of the second aspect, in a third possible implementation, the terminal may further include a segmentation module. The segmentation module is configured to: before the sending module sends the at least one probe request frame, divide the authentication information of the first wireless local area network into at least two parts, to obtain at least two pieces of segmental authentication information, where the at least one first probe request frame sent by the sending module includes at least two first probe request frames, each of the at least two first probe request frames includes one piece of segmental authentication information, and the at least two first probe request frames are in a one-to-one correspondence with the at least two pieces of segmental authentication information.

With reference to any one of the second aspect or the possible implementations of the second aspect, in a fourth possible implementation, the terminal may further include a display module. The display module is configured to: before the obtaining module obtains the authentication information of the first wireless local area network, display a display interface of a first application, where the display interface of the first application includes an authentication information entry window; and the obtaining module is specifically configured to obtain the authentication information of the first wireless local area network entered by a user in the authentication information entry window displayed by the display module.

With reference to the fourth possible implementation, in a fifth possible implementation, the terminal is an Android terminal.

With reference to the fourth possible implementation, in a sixth possible implementation, the terminal is an IOS terminal, and the terminal may further include an adding module and an importing module. The adding module is configured to: after the obtaining module obtains the authentication information of the first wireless local area network entered by the user in the authentication information entry window, and before the sending module sends the at least one first probe request frame, add the authentication information of the first wireless local area network to an IOS description file. The display module is further configured to display a description file installation interface of the IOS terminal. The obtaining module is further configured to obtain a first input of the user on the description file installation interface displayed by the display module. The importing module is configured to import the IOS description file into an IOS system of the IOS terminal in response to the first input obtained by the obtaining module.

According to a third aspect, this application provides a terminal, and the terminal includes a processor, a memory, and a communications interface. The processor, the memory, and the communications interface are connected. The memory is configured to store computer program code, and the computer program code includes a computer instruction. When the processor executes the computer instruction, the processor performs the following operations:

the processor is configured to: obtain authentication information of a first wireless local area network, where the authentication information of the first wireless local area network includes a service set identifier SSID and an access password of the first wireless local area network; and configure the SSID of the first wireless local area network as a hidden SSID; and the processor is further configured to control the communications interface to send at least one first probe request frame, where the first probe request frame carries at least a part of the authentication information of the first wireless local area network.

With reference to the third aspect, in a first possible implementation, the first probe request sent by the communications interface is not responded to by an access point that establishes the first wireless local area network.

With reference to the third aspect or the first possible implementation, in a second possible implementation, an SSID field of the first probe request frame sent by the communications interface carries the at least a part of the authentication information of the first wireless local area network.

With reference to any one of the third aspect or the possible implementations of the third aspect, the processor is further configured to: before the communications interface sends the at least one probe request frame, divide the authentication information of the first wireless local area network into at least two parts, to obtain at least two pieces of segmental authentication information, where the at least one first probe request frame sent by the communications interface includes at least two first probe request frames, each of the at least two first probe request frames includes one piece of segmental authentication information, and the at least two first probe request frames are in a one-to-one correspondence with the at least two pieces of segmental authentication information.

With reference to any one of the third aspect or the possible implementations of the third aspect, in a fourth possible implementation, the terminal further includes a touchscreen. The processor is further configured to: before obtaining the authentication information of the first wireless local area network, control the touchscreen to display a display interface of a first application, where the display interface of the first application includes an authentication information entry window; and the processor is specifically configured to obtain the authentication information of the first wireless local area network entered by a user in the authentication information entry window.

With reference to the fourth possible implementation, in a fifth possible implementation, the terminal is an Android terminal.

With reference to the fourth possible implementation, in a sixth possible implementation, the terminal is an IOS terminal. The processor is further configured to: after obtaining the authentication information of the first wireless local area network, and before the communications interface sends the at least one first probe request frame, add the authentication information of the first wireless local area network to an IOS description file; control the touchscreen to display a description file installation interface of the IOS terminal; and obtain a first input of the user on the description file installation interface displayed by the touchscreen, and import the IOS description file into an IOS system of the IOS terminal in response to the first input.

It can be understood that both the terminals provided in the second aspect and the third aspect are configured to execute the method provided in any one of the first aspect or the possible implementations of the first aspect. Therefore, for beneficial effects that can be achieved by the terminals, reference may be made to the beneficial effects of the corresponding method provided above. Details are not described herein again.

According to a fourth aspect, this application provides a wireless local area network configuration method. The method is applied to a terminal, and the method includes: obtaining authentication information of a first wireless local area network, where the authentication information of the first wireless local area network includes an SSID and an access password of the first wireless local area network; configuring the SSID of the first wireless local area network as a hidden SSID in response to the obtaining authentication information of a first wireless local area network; and sending at least one first probe request frame in response to the configuring the SSID of the first wireless local area network as a hidden SSID, where the first probe request frame carries at least a part of the authentication information of the first wireless local area network.

According to the wireless local area network configuration method provided in this application, in a Wi-Fi standard, for a wireless local area network with a hidden SSID, a probe request frame may carry the SSID of the wireless local area network. Based on this stipulation in the Wi-Fi standard, the terminal may configure the SSID of the first wireless local area network as the hidden SSID in response to the obtaining authentication information of a first wireless local area network. In this case, the terminal may send a probe request frame (namely, a probe request frame or the first probe request frame) carrying the authentication information of the first wireless local area network.

The probe request frame sent by the terminal does not need to be forwarded by a wireless router, so that there is no impact on another data service on the wireless router. In addition, the probe request frame is a Wi-Fi management frame, and a Wi-Fi module in any home device can listen to and receive the probe request frame. This can ensure that a home device can receive the probe request frame, and therefore can obtain the SSID and the access password that are carried in the probe request frame, so as to connect to the first wireless local area network by using the SSID and the access password. In other words, this application can increase a success rate of configuring authentication information of a home wireless local area network for a home device, and improve efficiency in connecting the home device to the home wireless local area network.

With reference to the fourth aspect, in a first possible implementation, the first probe request is not responded to by an access point that establishes the first wireless local area network. Generally, after a station (STA) (namely, the terminal) sends a probe request frame, if the AP receives the probe request frame, when determining that an SSID corresponding to the AP is the same as an SSID carried in the probe request frame, the AP may reply to the STA with a probe response frame in response to the probe request. The first probe request in this application is not intended to detect the first wireless local area network, but is intended to transmit the authentication information of the first wireless local area network to the home device. Therefore, the first probe request is not responded to by the AP that establishes the first wireless local area network.

With reference to the fourth aspect or the first possible implementation, in a second possible implementation, an SSID field of the first probe request frame carries the at least a part of the authentication information of the first wireless local area network. Generally, when an SSID of a wireless local area network is a hidden SSID, an SSID field of a probe request frame for detecting the wireless local area network carries the SSID of the wireless local area network. However, in this application, the SSID field of the probe request frame may carry the at least a part of the authentication information of the first wireless local area network.

With reference to any one of the fourth aspect or the possible implementations of the fourth aspect, in a third possible implementation, before the "sending the at least one probe request frame", the method in this application further includes: dividing the authentication information of the first wireless local area network into at least two parts in response to the configuring the SSID of the first wireless local area network as a hidden SSID, to obtain at least two pieces of segmental authentication information, where the at least one first probe request frame includes at least two first probe request frames, each of the at least two first probe request frames includes one piece of segmental authentication information, and the at least two first probe request frames are in a one-to-one correspondence with the at least two pieces of segmental authentication information.

According to a fifth aspect, this application provides a terminal, and the terminal includes an obtaining module, a configuration module, and a sending module. The obtaining module is configured to obtain authentication information of a first wireless local area network, where the authentication information of the first wireless local area network includes a service set identifier SSID and an access password of the first wireless local area network. The configuration module is configured to configure the SSID of the first wireless local area network as a hidden SSID in response to obtaining, by the obtaining module, the authentication information of the first wireless local area network. The sending module is configured to send at least one first probe request frame in response to configuring, by the configuration module, the SSID of the first wireless local area network as the hidden SSID, where the first probe request frame carries at least a part of the authentication information of the first wireless local area network.

With reference to the fifth aspect, in a first possible implementation, the first probe request sent by the sending module is not responded to by an access point that establishes the first wireless local area network.

With reference to the fifth aspect or the first possible implementation, in a second possible implementation, an SSID field of the first probe request frame sent by the sending module carries the at least a part of the authentication information of the first wireless local area network.

With reference to any one of the fifth aspect or the foregoing possible implementations, in a third possible implementation, the terminal further includes a segmentation module. The segmentation module is configured to: before the sending module sends the at least one probe request frame, divide the authentication information of the first wireless local area network into at least two parts in response to configuring, by the configuration module, the SSID of the first wireless local area network as the hidden SSID, to obtain at least two pieces of segmental authentication information, where the at least one first probe request frame sent by the sending module includes at least two first probe request frames, each of the at least two first probe request frames includes one piece of segmental authentication information, and the at least two first probe request frames are in a one-to-one correspondence with the at least two pieces of segmental authentication information.

According to a sixth aspect, this application provides a terminal, and the terminal includes a processor, a memory, and a communications interface. The processor, the memory, and the communications interface are connected. The memory is configured to store computer program code, and the computer program code includes a computer instruction. When the processor executes the computer instruction, the processor performs the following operations:

the processor is configured to: obtain authentication information of a first wireless local area network, where the authentication information of the first wireless local area network includes a service set identifier SSID and an access password of the first wireless local area network; configure the SSID of the first wireless local area network as a hidden SSID in response to the obtaining authentication information of a first wireless local area network; and in response to the configuring the SSID of the first wireless local area network as a hidden SSID, control the communications interface to send at least one first probe request frame, where the first probe request frame carries at least a part of the authentication information of the first wireless local area network.

With reference to the sixth aspect, in a first possible implementation, the first probe request sent by the communications interface is not responded to by an access point that establishes the first wireless local area network.

With reference to the sixth aspect or the first possible implementation, in a second possible implementation, an SSID field of the first probe request frame sent by the communications interface carries the at least a part of the authentication information of the first wireless local area network.

With reference to any one of the sixth aspect or the possible implementations of the sixth aspect, in a third possible implementation, the processor is further configured to: before the communications interface sends the at least one probe request frame, divide the authentication information of the first wireless local area network into at least two parts in response to the configuring the SSID of the first wireless local area network as a hidden SSID, to obtain at least two pieces of segmental authentication information, where the at least one first probe request frame sent by the communications interface includes at least two first probe request frames, each of the at least two first probe request frames includes one piece of segmental authentication information, and the at least two first probe request frames are in a one-to-one correspondence with the at least two pieces of segmental authentication information.

It can be understood that both the terminals provided in the fifth aspect and the sixth aspect are configured to execute the method provided in any one of the fourth aspect or the possible implementations of the fourth aspect. Therefore, for beneficial effects that can be achieved by the terminals, reference may be made to the beneficial effects of the corresponding method provided above. Details are not described herein again.

According to a seventh aspect, this application further provides a computer storage medium. The computer storage medium stores a computer instruction, and when the computer instruction runs on a terminal, the terminal is enabled to execute the wireless local area network configuration method described in the first aspect, the fourth aspect, or any possible implementation thereof in this application.

According to an eighth aspect, this application further provides a computer program product. When the computer program product runs on a computer, the computer is enabled to execute the wireless local area network configuration method described in the first aspect, the fourth aspect, or any possible implementation thereof in this application.

It can be understood that both the computer storage medium provided in the seventh aspect and the computer program product provided in the eighth aspect are configured to execute the corresponding method provided above. Therefore, for beneficial effects that can be achieved by the computer storage medium and the computer program product, reference may be made to the beneficial effects of the corresponding method provided above. Details are not described herein again.

BRIEF DESCRIPTION OF DRAWINGS

FIG. 15A and FIG. 15B are a flowchart 4 of a wireless local area network configuration method according to this application is

DESCRIPTION OF EMBODIMENTS

A wireless local area network configuration method and a device that are provided in this application may be applied to a Wi-Fi network configuration process of a home device, and are specifically applied to a process of configuring an SSID and an access password of a home Wi-Fi network for a home device by using a device such as a mobile phone or a tablet computer, to connect the home device to the home Wi-Fi network.

For example, the home device in this application may be a smart home device with a Wi-Fi access function. For example, the smart home device may be a smart TV, a smart refrigerator, a smart washing machine, or a smart rice cooker. The device in this application may be a portable computer, a mobile phone (such as a mobile phone 101 shown in FIG. 2), a personal computer (Personal Computer, PC), a wearable electronic device, a tablet computer, or the like. A specific form of the device is not particularly limited in this application.

Figure 1:
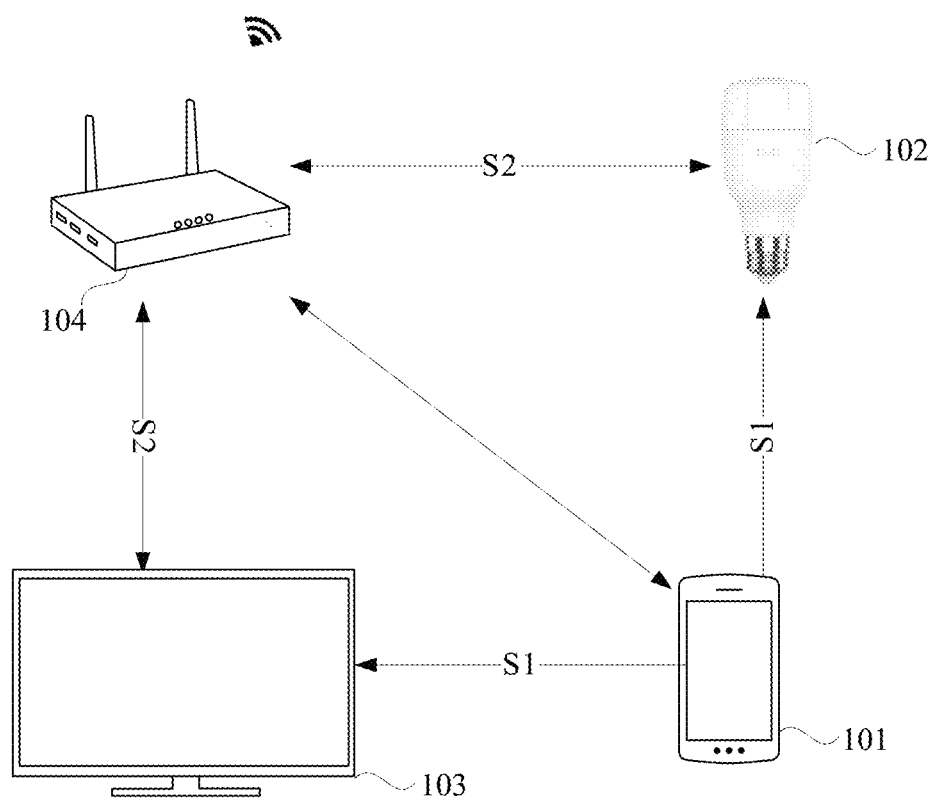
FIG. 1 is a schematic architectural diagram of a Wi-Fi network according to this application.

FIG. 1 is a schematic architectural diagram of a Wi-Fi network to which a wireless local area network configuration method provided in this application is applied. As shown in FIG. 1, the Wi-Fi network 100 may include a mobile phone 101, at least one home device (such as a smart light bulb 102 and a smart TV 103), and a wireless router 104.

As shown in FIG. 1, a user may enter, on the mobile phone 101, authentication information (namely, an SSID and an access password of a Wi-Fi network provided by the wireless router 104) of the wireless router 104; subsequently, the mobile phone may send the authentication information of the wireless router 104 to the smart light bulb 102 and the smart TV 103 (in other words, S1 is performed). The smart light bulb 102 is used as an example. After receiving the authentication information of the wireless router 104, the smart light bulb 102 may connect, by using the authentication information of the wireless router 104, to the home Wi-Fi network provided by the wireless router 104 (in other words, S2 is performed).

Specifically, in this application, a manner of sending the authentication information of the wireless router 104 to the smart light bulb 102 and the smart TV 103 by the mobile phone 101 may be as follows: The mobile phone 101 sends a probe request frame carrying the authentication information of the wireless router 104, where the probe request frame may be sent by the mobile phone 101 when the SSID of the wireless local area network provided by the wireless router 104 is configured as a "hidden SSID". The authentication information of the wireless router 104 (namely, authentication information of the wireless local area network provided by the wireless router 104, such as the SSID and the access password of the wireless local area network) may be carried in an SSID field of the probe request frame.

Figure 2:
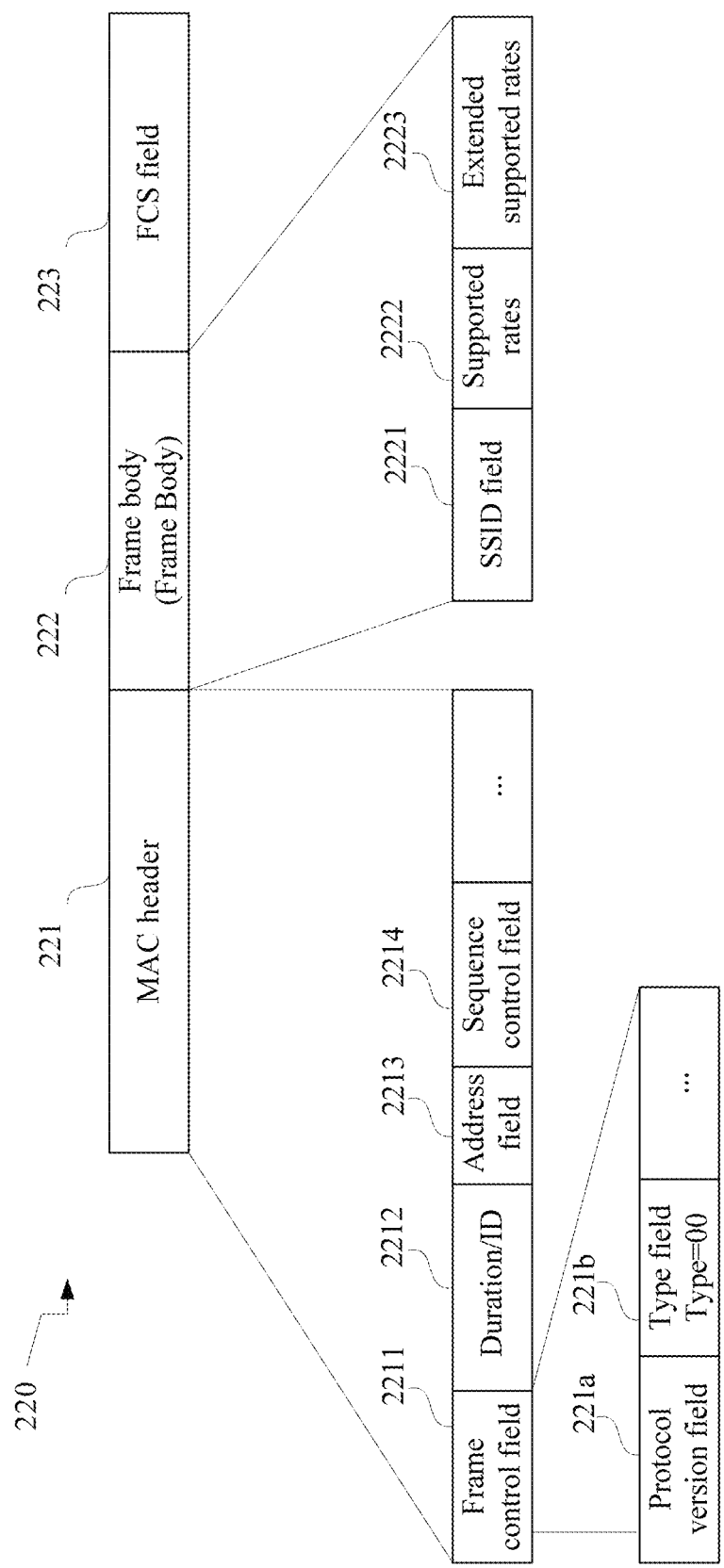
FIG. 2 is a schematic diagram of a frame structure of a probe request frame according to this application.

FIG. 2 is a schematic diagram of an example of a frame structure of a probe request frame according to this application. As shown in FIG. 2, the probe request frame 220 may include a frame header (namely, a MAC header) 221, a frame body (Frame Body) 222, and a frame check sequence (FCS) field 223. The MAC header 221 is a Media Access Control (MAC) header.

As shown in FIG. 2, the MAC header 221 may include a frame control field 2211, a duration/field 2212, an field 2213, a sequence control) field 2214, and the like.

The frame control field 2211 may include a protocol version field 221*a* and a type field 221*b*. The protocol version field 221*a* is used to indicate a protocol version to which the probe request frame 220 conforms, where the protocol version is usually 0. The type field 221*b* may include Type and Subtype. Type is used to indicate that a corresponding frame is a management frame, a data frame, or a control frame, and Subtype is used to indicate a subtype of the frame. For example, Type=00 may indicate that the corresponding frame is the management frame. In this case, Subtype may indicate a type of the management frame, such as a beacon frame, a probe request frame, and a probe response frame. The address field 2213 may include address information such as a source address, a destination address, a transmit workstation address, and a receive workstation address. The destination address may be any one of a unicast address, a multicast address (Multicast address), and a broadcast address.

As shown in FIG. 2, the frame body 222 includes an SSID field 2221, supported rates 2222, and extended supported rates 2223. The supported rates 2222 and the extended supported rates 2223 are used to indicate a set of rates supported by a mobile phone or a wireless router.

The probe request frame may be a management frame in IEEE 802.11. A station (STA) (such as the mobile phone 101) may detect a Wi-Fi signal by proactively sending a probe request frame. Specifically, the probe request frame proactively sent by the STA may be classified into two types.

A first type of probe request frame is used to detect a Wi-Fi signal in an area in which the STA is located, and this type of probe request frame does not carry an SSID.

Figure 3:
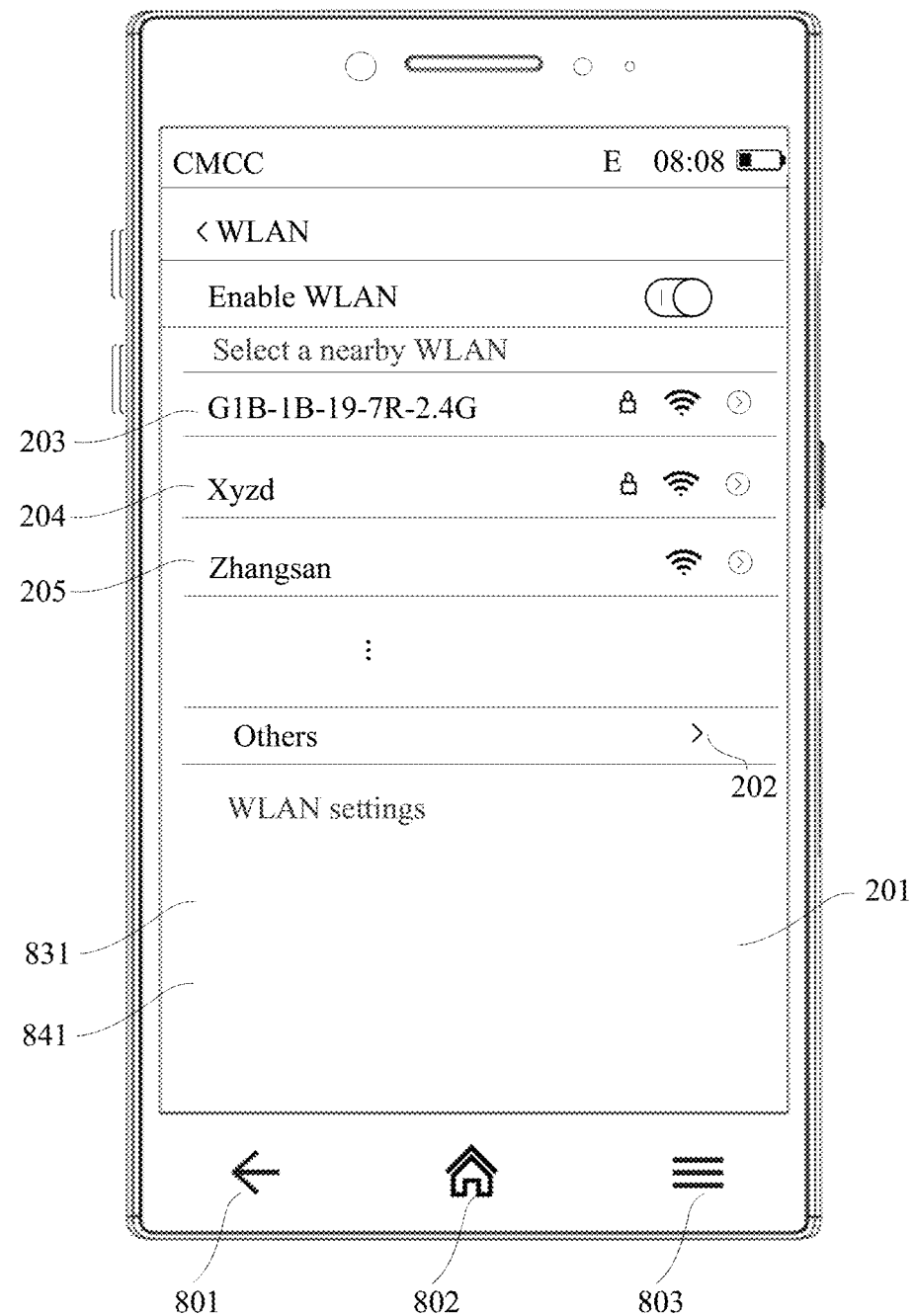
FIG. 3 is a schematic diagram 1 of an example of a Wi-Fi login interface of a terminal according to this application.

For example, it is assumed that the SSID of the wireless local area network (namely, the Wi-Fi network) provided by the wireless router 104 is Xyzd, and it is configured, in the wireless router 104, that the SSID of the Wi-Fi network provided by the wireless router 104 is visible to a terminal (the SSID of the Wi-Fi network is not a hidden SSID). In this case, after proactively sending the first type of probe request frame, the mobile phone 101 can detect the SSID (for example, Xyzd) of the wireless local area network provided by the wireless router 104 and an SSID of another wireless local area network in an area in which the mobile phone 101 is located, and display a wireless local area network interface 201 shown in FIG. 3. As shown in FIG. 3, the wireless local area network interface 201 may include a plurality of SSIDs such as G1B-1B-19-7R-2.4G 203, Xyzd 204 (namely, the SSID of the Wi-Fi network provided by the wireless router 104), and Zhangsan 205.

Figure 4:
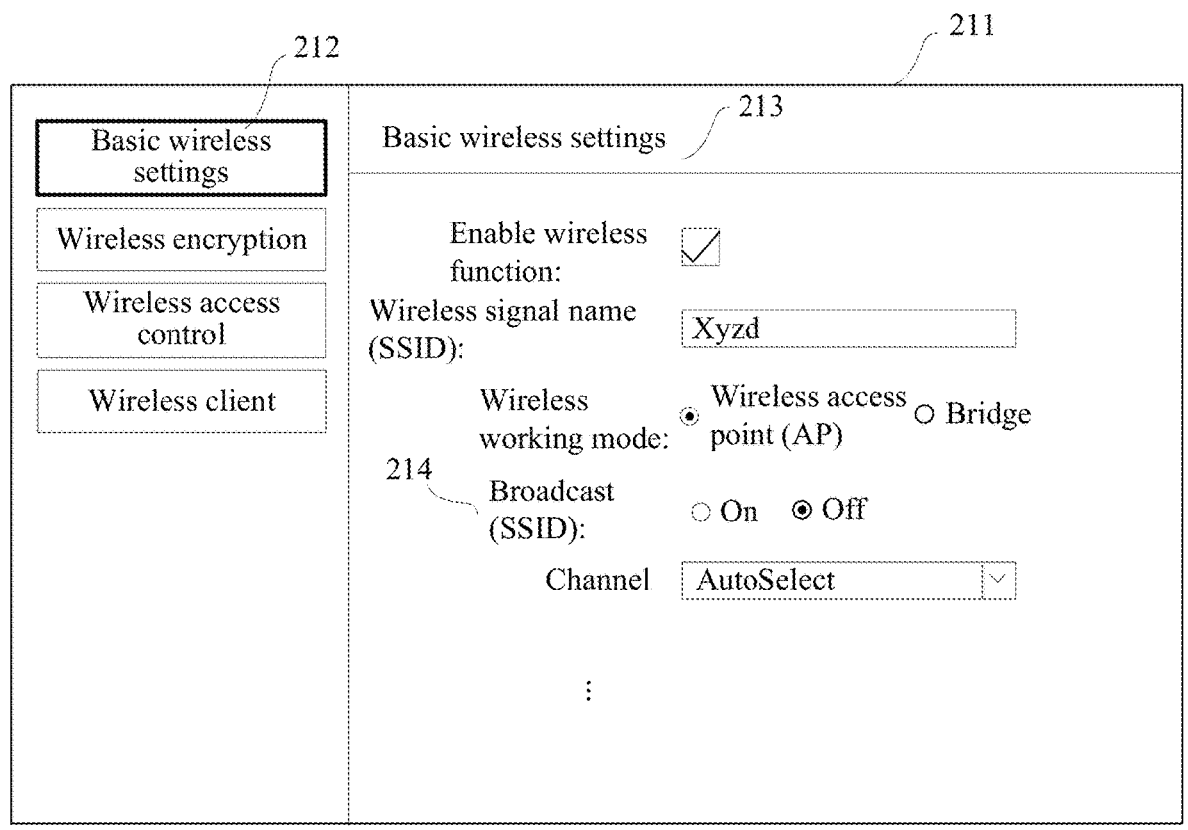
FIG. 4 is a schematic diagram of an example of a setting interface of a wireless router according to this application.

That the SSID of the wireless local area network provided by the wireless router 104 is configured as a "hidden SSID" specifically means that a wireless signal SSID broadcast function of the wireless router 104 is disabled or the wireless router 104 is configured to "not broadcast an SSID". For example, the user logs in on a configuration interface 211, shown in FIG. 4, of a wireless router by using a mobile phone or a PC. An interface 213 corresponding to a wireless setting option 212 on the configuration interface 211 shown in FIG. 4 includes an "option 214 for broadcasting an SSID signal of a wireless router". As shown in FIG. 4, when the user sets the "option 214 for broadcasting an SSID signal of a wireless router" to off, an SSID of a wireless local area network corresponding to the wireless router is a "hidden SSID".

Figure 5:
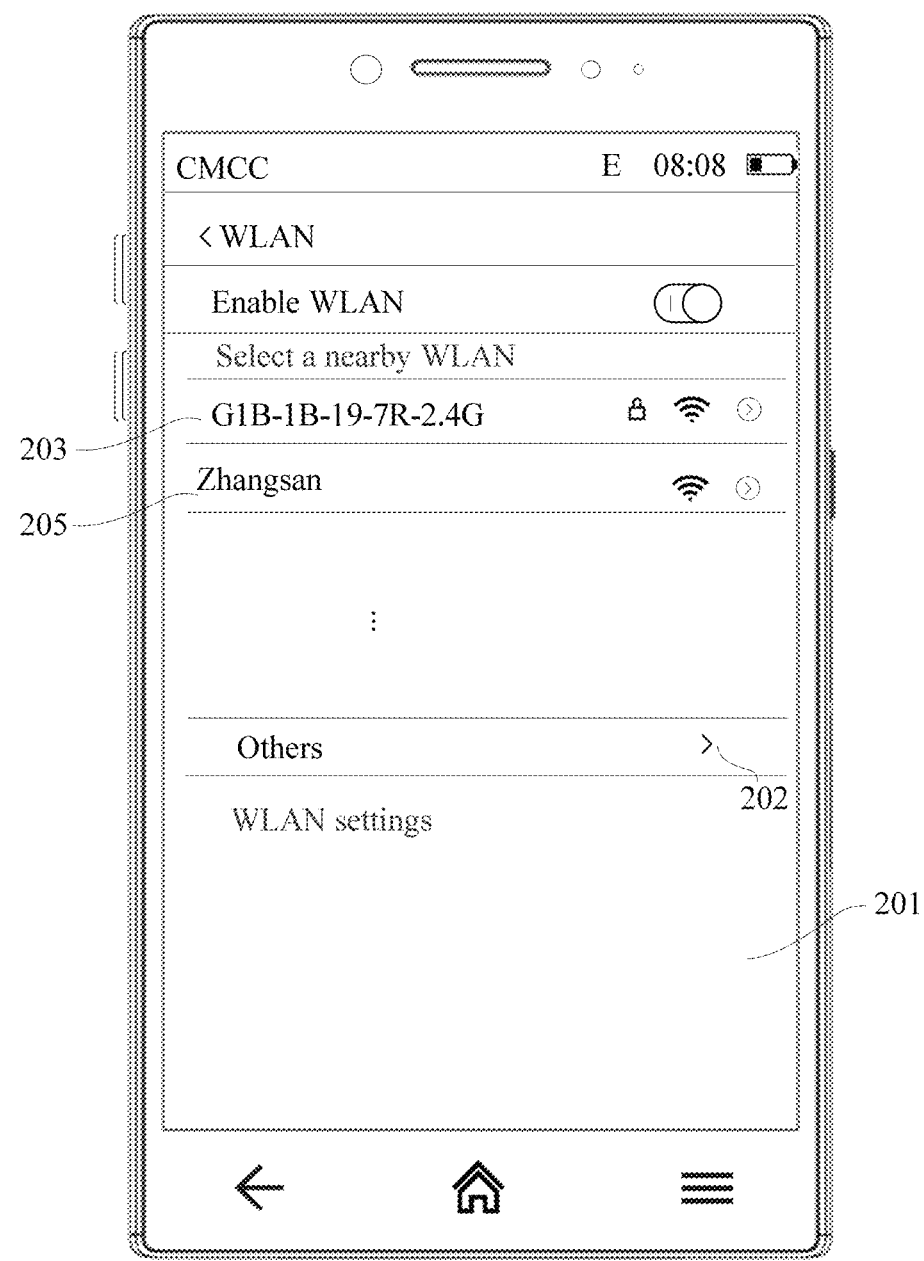
FIG. 5 is a schematic diagram 2 of an example of a Wi-Fi login interface of a terminal according to this application.

When the SSID of the wireless local area network provided by the wireless router 104 is in a "hidden state", the wireless router 104 does not proactively broadcast the SSID of the wireless local area network. In addition, the terminal (such as a mobile phone) cannot detect the SSID of the wireless local area network, either. In other words, the SSID of the wireless local area network is not displayed in a Wi-Fi list of the terminal. For example, it is assumed that a mobile phone shown in FIG. 5 is located in a coverage area of the wireless local area network provided by the wireless router 104. As shown in FIG. 4, when the user sets the "option 214 for broadcasting an SSID signal of a wireless router" to off, Xyzd (namely, the SSID of the wireless local area network provided by the wireless router 104) is not displayed in a Wi-Fi list of the mobile phone shown in FIG. 5.

Figure 6B:
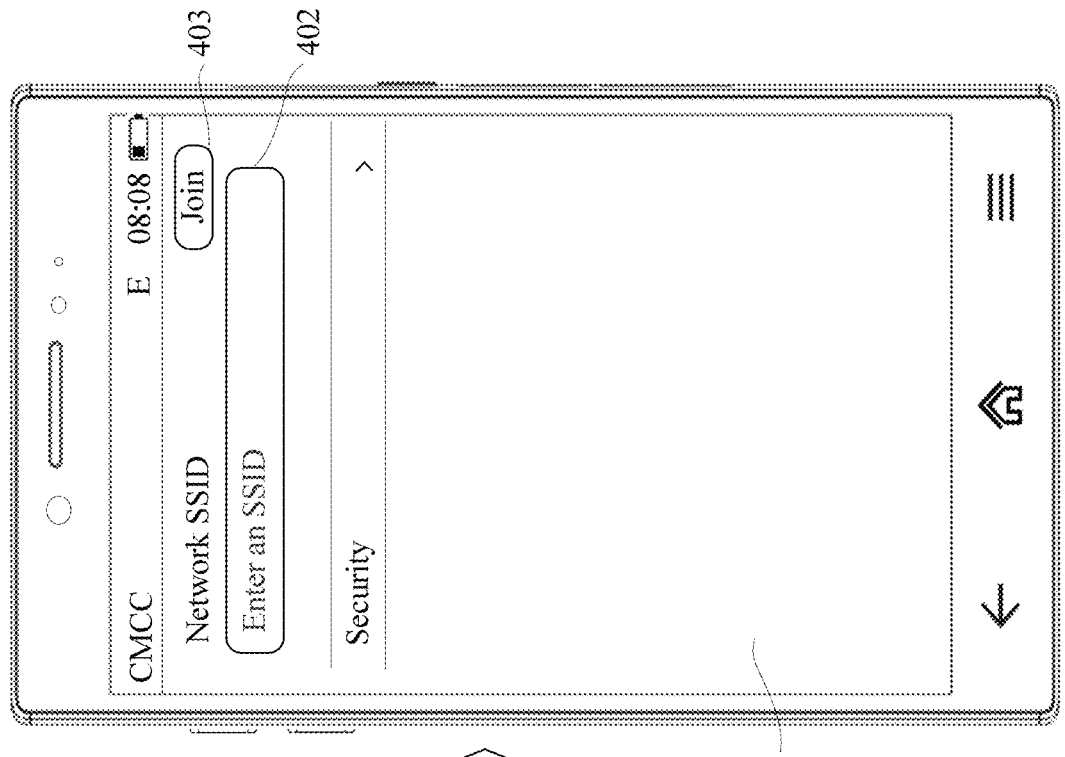
FIG. 6A and FIG. 6B are a schematic diagram 3 of an example of a Wi-Fi login interface of a terminal according to this application.
Figure 6A:
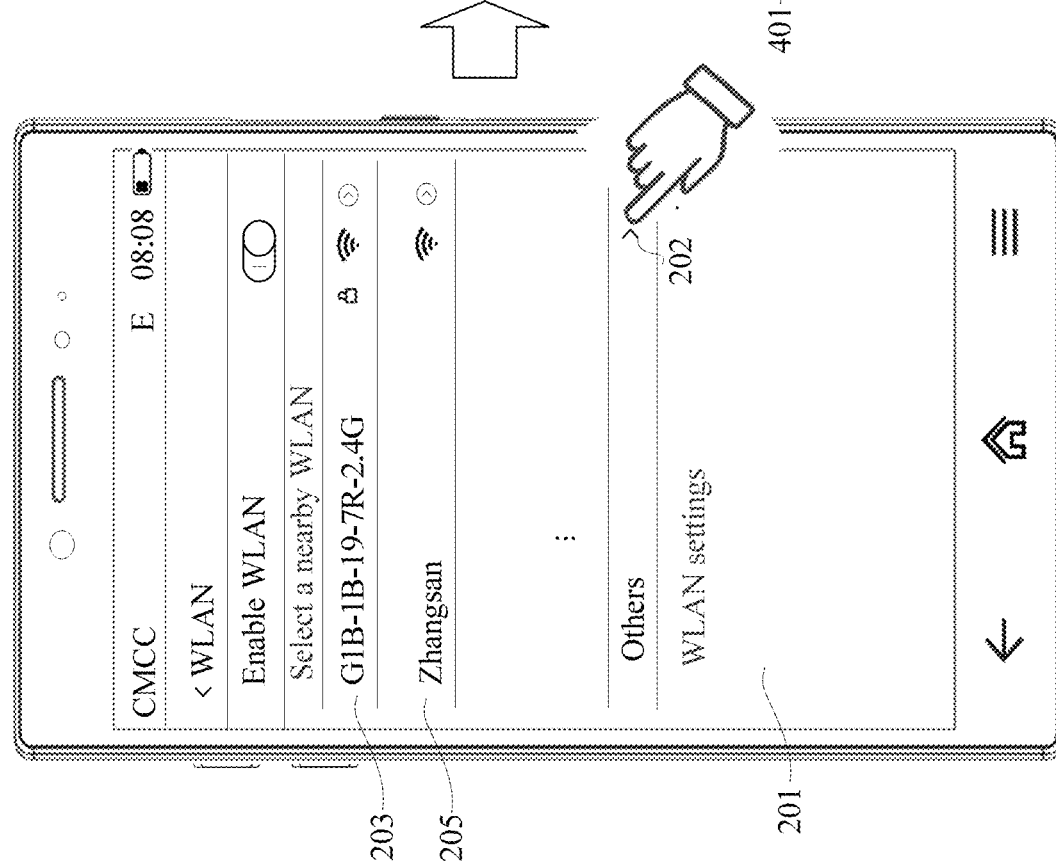
Figure 7:
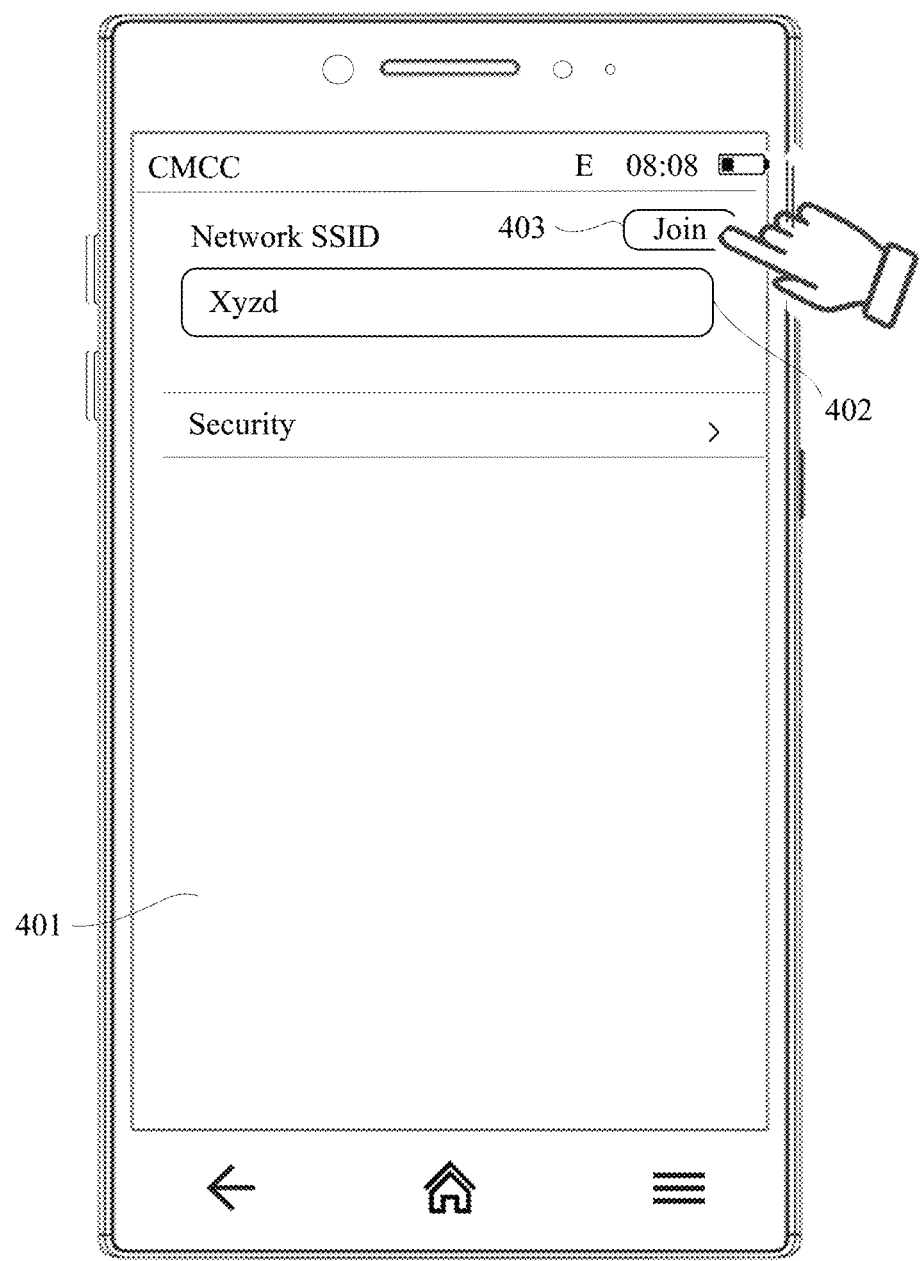
FIG. 7 is a schematic diagram 4 of an example of a Wi-Fi login interface of a terminal according to this application.

If the user expects to control the mobile phone 101 to connect to the wireless local area network (namely, the Wi-Fi network) provided by the wireless router 104, the user may tap an "Others" option 202 on a wireless local area network interface 201 shown in FIG. 6A. Then, the mobile phone 101 may display a Wi-Fi login interface 401 shown in FIG. 6B. As shown in FIG. 6B, the Wi-Fi login interface 401 may include an SSID input box 402 and a "Join" option 403. Then, as shown in FIG. 7, after the user enters "Xyzd" in the SSID input box 402 and taps the "Join" option 403, the mobile phone 101 may proactively send a second type of probe request frame carrying the SSID (namely, Xyzd). After receiving the second type of probe request frame carrying the SSID (namely, Xyzd), the wireless router 104 may reply to the mobile phone 101 with a probe response frame, so that the wireless router 104 can continue to interact with the mobile phone 101 and perform wireless local area network access authentication.

It should be noted that the second type of probe request frame is used for targeted access to a wireless local area network, and an SSID field of this type of probe request frame includes an SSID of the corresponding wireless local area network. For example, an SSID field of the second type of probe request frame proactively sent by the mobile phone 101 includes "Xyzd" (namely, the SSID).

In this application, the terminal (for example, the mobile phone 101) may add, to the second type of probe request frame, the SSID (such as "Xyzd") and the access password (such as "xy456258") of the Wi-Fi network provided by the wireless router 104, and send the probe request frame. In this way, a home device that listens to a Wi-Fi frame can receive the probe request frame, and then connect to the home wireless local area network by using the SSID and the access password that are carried in the probe request frame.

The SSID and the access password of the Wi-Fi network provided by the wireless router 104 may be carried in the SSID field of the probe request frame.

Figure 8:
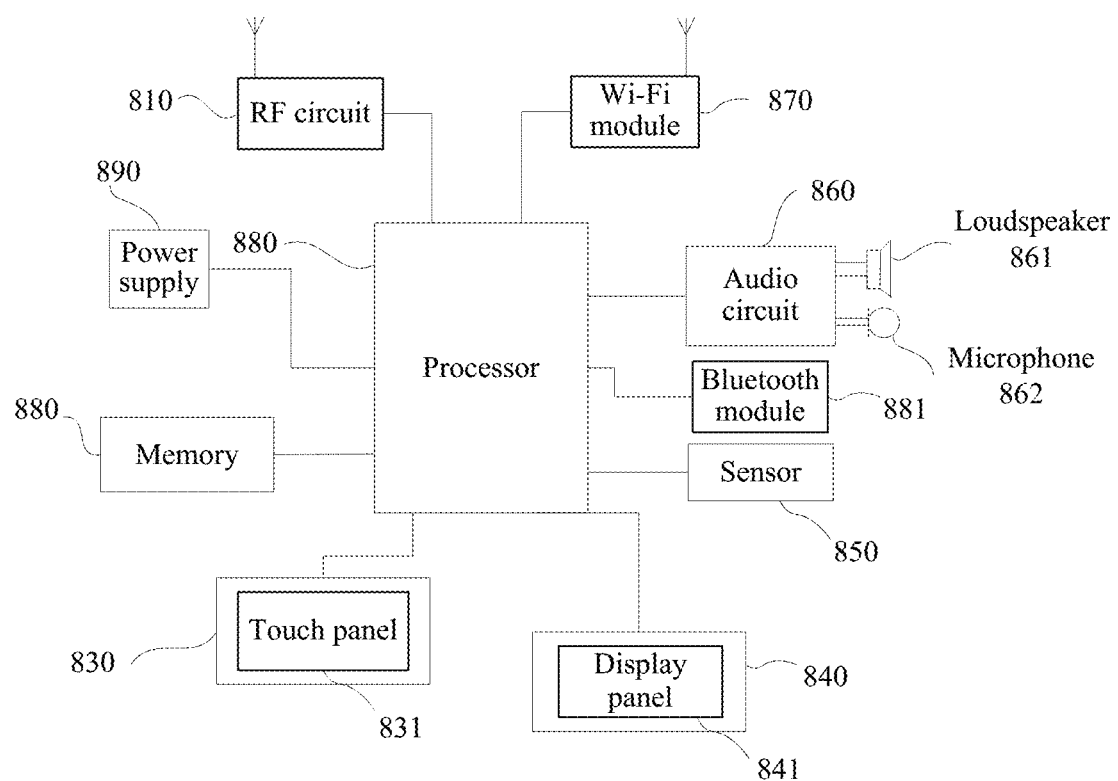
FIG. 8 is a schematic diagram of a hardware structure of a mobile phone according to this application.

In the following embodiments, a mobile phone is used as an example to describe how a terminal implements specific technical solutions in the embodiments. As shown in FIG. 8, the terminal in this embodiment may be the mobile phone 101. The following describes this embodiment in detail by using the mobile phone 101 as an example.

It should be understood that the mobile phone 101 shown in the figure is merely an example of the terminal, and the mobile phone 101 may have more or fewer parts than those shown in the figure, may have a combination of two or more parts, or may have parts disposed differently. The parts shown in FIG. 8 may be implemented by using hardware including one or more signal processing units and/or an application-specific integrated circuit, software, or a combination of the hardware and the software.

As shown in FIG. 8, the mobile phone 101 includes parts such as an RF (Radio Frequency, radio frequency) circuit 810, a memory 820, an input unit 830, a display unit 840, a sensor 850, an audio circuit 860, a Wi-Fi module 870, a processor 880, and a power supply 890. A person skilled in the art may understand that a mobile phone structure shown in FIG. 8 does not constitute any limitation on the mobile phone, and the mobile phone may include more or fewer parts than those shown in the figure, or a combination of some parts, or parts disposed differently.

The following describes each constituent part of the mobile phone 101 in detail with reference to FIG. 8.

The RF circuit 810 may be configured to: receive and send information, or receive and send a signal during a call. The RF circuit 810 may receive downlink information from a base station, and then send the downlink information to the processor 880 for processing. In addition, the RF circuit 810 sends uplink data to the base station. Generally, the RF circuit includes but is not limited to devices such as an antenna, at least one amplifier, a transceiver, a coupler, a low noise amplifier, and a duplexer. In addition, the RF circuit 810 may further communicate with a network and another mobile device through wireless communication. Any communications standard or protocol may be used for wireless communication, including but not limited to the Global System for Mobile Communications, a general packet radio service, Code Division Multiple Access, Wideband Code Division Multiple Access, Long Term Evolution, an email, a short message service, and the like.

The memory 820 may be configured to store a software program and data. The processor 880 runs the software program and the data that are stored in the memory 820, to perform various functions of the mobile phone 101 and process data. The memory 820 may mainly include a program storage area and a data storage area. The program storage area may store an operating system, an application program required by at least one function (for example, an audio playback function and an image playback function), and the like. The data storage area may store data (for example, audio data and an address book) created based on use of the mobile phone 101, and the like. In addition, the memory 820 may include a high-speed random access memory, and may further include a non-volatile memory such as at least one magnetic disk storage device, a flash memory device, or another volatile solid-state storage device. In the following embodiments, the memory 820 stores an operating system that enables the mobile phone 101 to run, for example, an IOS® operating system developed by Apple, an Android® open source operating system developed by Google, or a Windows® operating system developed by Microsoft.

The input unit 830 (for example, a touchscreen) may be configured to: receive entered numeral or character information, and generate a signal input related to user setting and function control of the mobile phone 101. Specifically, the input unit 830 may include a touch panel 831 that is shown in FIG. 3 and that is disposed on a front of the mobile phone 101. The touch panel 831 may collect a touch operation of a user on or near the touch panel 831 (for example, an operation performed on the touch panel 831 or near the touch panel 831 by the user by using any suitable object or accessory such as a finger or a stylus), and drive a corresponding connection apparatus according to a preset program. Optionally, the touch panel 831 may include two parts: a touch detection apparatus and a touch controller (not shown in FIG. 8). The touch detection apparatus detects a location touched by the user, detects a signal generated by a touch operation, and transmits the signal to the touch controller. The touch controller receives touch information from the touch detection apparatus, converts the touch information into touch point coordinates, and sends the touch point coordinates to the processor 880, and can receive and execute an instruction sent by the processor 880. In addition, the touch panel 831 may be implemented in a plurality of types such as a resistive type, a capacitive type, an infrared type, and a surface acoustic wave type.

The display unit 840 (namely, a display screen) may be configured to display information entered by the user or information provided for the user, and graphical user interfaces (GUI) of various menus of the mobile phone 101. The display unit 840 may include a display panel 841 disposed on the front of the mobile phone 101. The display panel 841 may be configured in a form of a liquid crystal display, a light-emitting diode, or the like.

As shown in FIG. 3, in some embodiments, three optical touch keys 801, 802, and 803 are disposed at a bottom of the front A of the mobile phone 101, and the touch panel 831 and the display panel 841 are further disposed. The touch panel 831 covers the display panel 841. After detecting a touch operation on or near the touch panel 831, the touch panel 831 sends information about the touch operation to the processor 880 to determine a touch event, and then the processor 880 provides a corresponding visual output on the display panel 841 based on a type of the touch event. In FIG. 2, the touch panel 831 and the display panel 841 are used as two separate parts to implement input and output functions of the mobile phone 101. However, in some embodiments, the touch panel 831 and the display panel 841 may be integrated to implement the input and output functions of the mobile phone 101. The touch panel 831 and the display panel 841 that are integrated may be referred to as a touch display screen.

In some other embodiments, a pressure sensor may be further disposed on the touch panel 831. In this way, when the user performs a touch operation on the touch panel, the touch panel can further detect a pressure of the touch operation, so that the mobile phone 101 can detect the touch operation more accurately.

The mobile phone 101 may further include at least one type of sensor 850, such as a light sensor, a motion sensor, and another sensor. Specifically, the light sensor may include an ambient light sensor and a proximity sensor. The ambient light sensor may adjust luminance of the display panel 841 based on brightness of ambient light. The optical proximity sensor is disposed on the front of the mobile phone 101. When the mobile phone 101 moves to an ear, the mobile phone 101 turns off power of the display panel 841 based on detection by the optical proximity sensor 852, so that power can be further saved for the mobile phone 101. As a type of motion sensor, an accelerometer sensor can detect values of accelerations in all directions (generally three axes), can detect a value and a direction of gravity when the mobile phone 101 is static, and can be used for an application for identifying a mobile phone posture (such as screen switching between a landscape mode and a portrait mode, a related game, or magnetometer posture calibration), a vibration-identification-related function (such as a pedometer or a knock), and the like. For another sensor that may be further configured for the mobile phone 101, such as a gyroscope, a barometer, a hygrometer, a thermometer, or an infrared sensor, details are not described herein.

The audio circuit 860, a loudspeaker 861, and a microphone 262 may provide an audio interface between the user and the mobile phone 101. The audio circuit 860 may transmit, to the loudspeaker 861, an electrical signal that is converted from received audio data, and the loudspeaker 861 converts the electrical signal into a sound signal for outputting. In addition, the microphone 262 converts a collected sound signal into an electrical signal, and the audio circuit 860 receives the electrical signal, converts the electrical signal into audio data, and then outputs the audio data to the RF circuit 810, so that the audio data is sent to, for example, another mobile phone, or the audio data is output to the memory 820 for further processing.

Wi-Fi is a short-range wireless transmission technology. The mobile phone 101 may connect to a home wireless local area network by using the Wi-Fi module 870, to help the user receive and send an email, browse a web page, access streaming media, and the like. The Wi-Fi module 870 provides wireless broadband Internet access for the user.

The processor 880 is a control center of the mobile phone 101, is connected to all parts of the entire mobile phone by using various interfaces and lines, and implements various functions of the mobile phone 101 and processes data by running or executing the software program stored in the memory 820 and by invoking the data stored in the memory 820, so as to perform overall monitoring on the mobile phone. In some embodiments, the processor 880 may include one or more processing units. An application processor and a modem processor may be further integrated into the processor 880. The application processor mainly processes an operating system, a user interface, an application program, and the like, and the modem processor mainly processes wireless communication. It can be understood that the modem processor may alternatively not be integrated into the processor 880.

A Bluetooth module 881 is configured to exchange information with another device by using such a short-range communications protocol as Bluetooth. For example, the mobile phone 101 may establish, by using the Bluetooth module 881, a Bluetooth connection to a wearable electronic device (for example, a smartwatch) that also has a Bluetooth module, to exchange data.

The mobile phone 101 further includes the power supply 890 (for example, a battery) that supplies power to each part. The power supply may be logically connected to the processor 880 by using a power supply management system, to implement functions such as charge management, discharge management, and power consumption management by using the power supply management system. It can be understood that, in the following embodiments, the power supply 890 may be configured to supply power to the display panel 841 and the touch panel 831.

All methods in the following embodiments may be implemented in the mobile phone 101 having the foregoing hardware structure.

Figure 9:
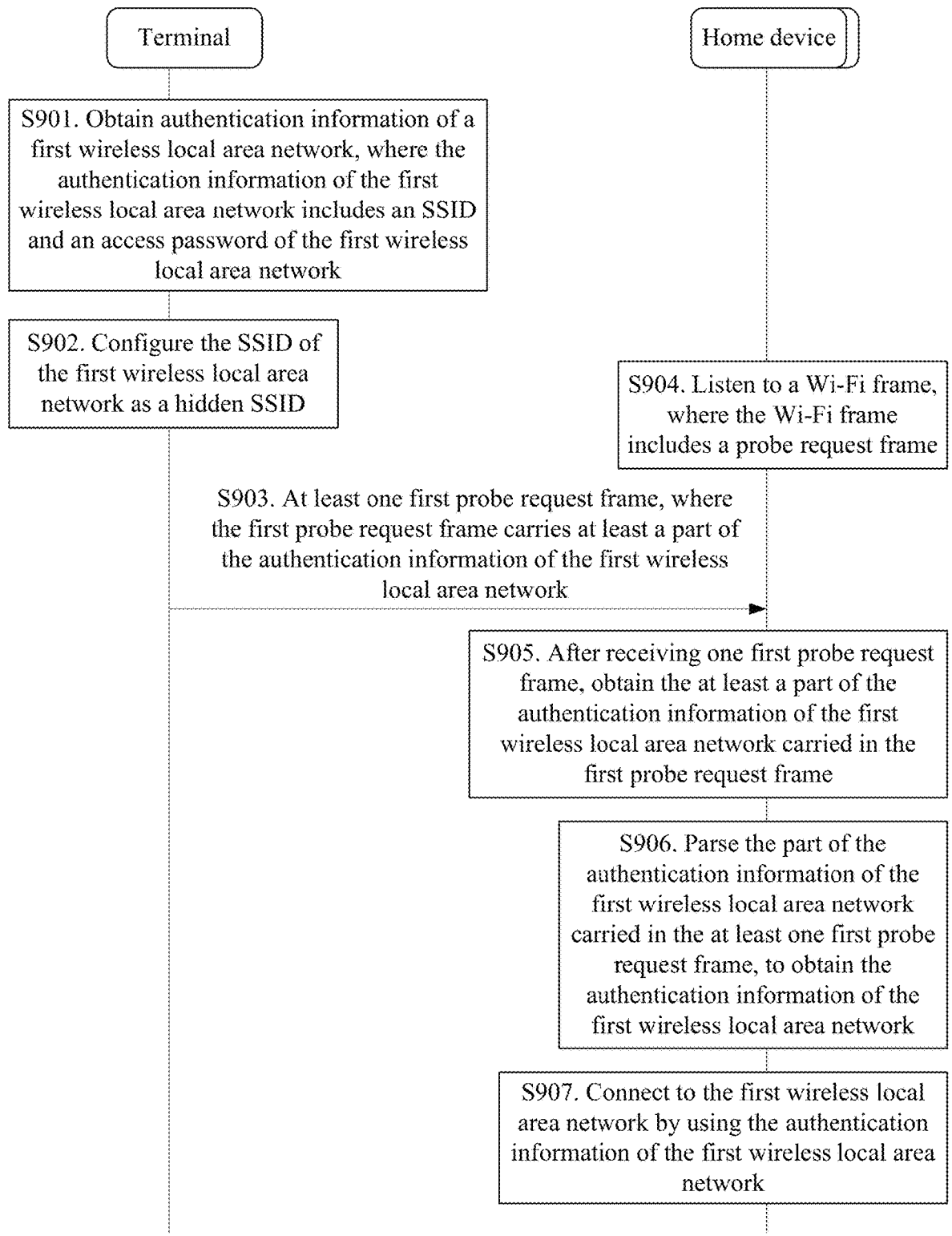
FIG. 9 is a flowchart 1 of a wireless local area network configuration method according to this application.

This application provides a wireless local area network configuration method, and the method may be applied to a process in which a terminal configures authentication information (namely, an SSID and an access password) of a home wireless local area network for a home device. As shown in FIG. 9, the wireless local area network configuration method provided in this application includes S901 to S907.

S901. A terminal obtains authentication information of a first wireless local area network, where the authentication information of the first wireless local area network includes an SSID and an access password of the first wireless local area network.

The first wireless local area network may be a Wi-Fi network, for example, the Wi-Fi network provided by the wireless router 104 shown in FIG. 1.

For example, the terminal may receive the authentication information of the first wireless local area network entered by a user. For example, the terminal may receive the authentication information of the first wireless local area network entered by the user in a home application program (APP) (namely, an app for controlling a home device), or the terminal may receive the authentication information of the first wireless local area network entered by the user on a Wi-Fi setting interface (for example, a display interface shown in FIG. 4B).

S902. The terminal configures the SSID of the first wireless local area network as a hidden SSID.

It can be learned from the foregoing description of this application that, in a Wi-Fi standard, a probe request frame for detecting a wireless local area network with a hidden SSID (namely, the foregoing second type of probe request frame) may carry the SSID of the wireless local area network. Based on this Wi-Fi standard, after the terminal configures the SSID of the first wireless local area network as the hidden SSID, a probe request (Probe Request) frame sent by the terminal may carry the SSID of the first wireless local area network. The probe request frame in this application not only carries the SSID of the first wireless local area network, but also carries the access password of the first wireless local area network.

S903. The terminal sends at least one first probe request frame, where the first probe request frame carries at least a part of the authentication information of the first wireless local area network.

After obtaining the authentication information of the first wireless local area network, the terminal may add the authentication information of the first wireless local area network, as the SSID of the first wireless local area network, to the at least one first probe request frame for sending.

Generally, after the terminal sends a probe request frame, an AP (for example, the wireless router 104) may receive the probe request frame, and when an SSID of a wireless local area network provided by the AP is the same as an SSID carried in the probe request frame, the AP replies to the terminal with a probe response frame in response to the probe request. However, the first probe request in this application is not intended to detect the first wireless local area network, but is intended to transmit the authentication information of the first wireless local area network to the home device. Therefore, the first probe request is not responded to by an AP that establishes the first wireless local area network.

An SSID field of the first probe request frame carries the at least a part of the authentication information of the first wireless local area network. In other words, the at least a part of the authentication information of the first wireless local area network may be carried in the SSID field of the first probe request frame.

S904. A home device listens to a Wi-Fi frame, where the Wi-Fi frame includes a probe request frame.

The probe request frame is a management frame in the Wi-Fi frame. The home device can listen to the Wi-Fi frame in real time. To be specific, after the terminal sends the first probe request frame, the home device can listen and obtain the first probe request frame and receive the first probe frame.

For example, the home device can listen to the Wi-Fi frame in a sniffer listening mode. A sniffer may be referred to as a sniffer, or may be referred to as data packet capture software, and is a technology that can be used to monitor a network status, a data flow status, and information transmitted on a network.

S905. After receiving one first probe request frame, the home device obtains the at least a part of the authentication information of the first wireless local area network carried in the first probe request frame.

S906. The home device parses the part of the authentication information of the first wireless local area network carried in the at least one first probe request frame, to obtain the authentication information of the first wireless local area network.

The at least a part of the authentication information of the first wireless local area network may be carried in the SSID field of the first probe request frame. After receiving one first probe request frame, the terminal may parse the SSID field of the first probe request frame, to obtain the at least a part of the authentication information of the first wireless local area network carried in the SSID field.

Further, to improve security of the authentication information of the first wireless local area network and prevent the authentication information of the wireless local area network from being stolen, the terminal may encrypt the authentication information of the first wireless local area network, and add the encrypted authentication information to the SSID field of the first probe request frame for sending. The terminal may encrypt the authentication information of the first wireless local area network by using an encryption password preset by the user, or the terminal may encrypt the authentication information of the first wireless local area network by using an encryption password preconfigured on the home device. An encryption device may decrypt the received encrypted authentication information of the first wireless local area network by using the corresponding encryption password.

Alternatively, the terminal and the home device may separately encrypt and decrypt the authentication information of the first wireless local area network by using an asymmetric encryption algorithm. For example, a public key (public key) may be marked on the home device, and the terminal may encrypt the authentication information of the first wireless local area network by using the public key. The home device may decrypt the authentication information, encrypted by using the public key, of the first wireless local area network by using a private key corresponding to the public key. Public keys (public key) marked on different home devices may be the same or different.

S907. The home device connects to the first wireless local area network by using the authentication information of the first wireless local area network.

After obtaining the authentication information of the first wireless local area network, the home device may connect to the first wireless local area network by using the authentication information of the first wireless local area network. In this case, the user can use the terminal to control the home device to connect to the first wireless local area network, to implement remote intelligent control over the home device.

According to the wireless local area network configuration method provided in this application, in the Wi-Fi standard, for a wireless local area network with a hidden SSID, a probe request frame may carry the SSID of the wireless local area network. Based on this stipulation in the Wi-Fi standard, the terminal may configure the SSID of the first wireless local area network as the hidden SSID after obtaining the authentication information of the first wireless local area network. In this case, the terminal may send a probe request frame (namely, a probe request frame or the first probe request frame) carrying the authentication information of the first wireless local area network.

The probe request frame sent by the terminal does not need to be forwarded by a wireless router, so that there is no impact on another data service on the wireless router. In addition, the probe request frame is a Wi-Fi management frame, and a Wi-Fi module in any home device can listen to and receive the probe request frame. This can ensure that the home device can receive the probe request frame, and therefore can obtain the SSID and the access password that are carried in the SSID field of the probe request frame, so as to connect to the first wireless local area network by using the SSID and the access password. In other words, this application can increase a success rate of configuring authentication information of a home wireless local area network for a home device, and improve efficiency in connecting the home device to the home wireless local area network.

Further, to prevent the home device from connecting to a wrong wireless local area network, for example, to prevent a case in which the home device connects to another home wireless local area network after receiving a probe request frame carrying authentication information of the another home wireless local area network, the SSID field of the first probe request frame in this application may further carry a feature code, where the feature code is used to identify the terminal.

After the home device receives one probe request frame, if a feature code in an SSID field of the probe request frame is different from a preset feature code, it indicates that the probe request frame carrying the SSID field is not sent by a specified terminal, and the home device cannot connect to a wireless local area network corresponding to an SSID carried in the SSID field. In this case, the home device may discard the probe request frame.

It can be understood that an SSID field of one first probe request frame may carry a limited amount of data. For example, an SSID field of one first probe request frame can carry a maximum of 32-byte data, but the authentication information of the first wireless local area network may include more than 32 bytes. Based on this case, the terminal may divide the authentication information of the first wireless local area network into at least two parts, and add obtained at least two pieces of segmental authentication information to SSID fields of at least two first probe request frames, respectively.

When an SSID field of one probe request frame is insufficient to carry the complete "authentication information of the first wireless local area network", the SSID fields of the at least two first probe request frames sent by the terminal further carry segment identifiers of the corresponding segmental authentication information. A segment identifier may be used to indicate a location or a reassembly sequence of corresponding segmental authentication information in the "authentication information of the first wireless local area network".

Figure 10:
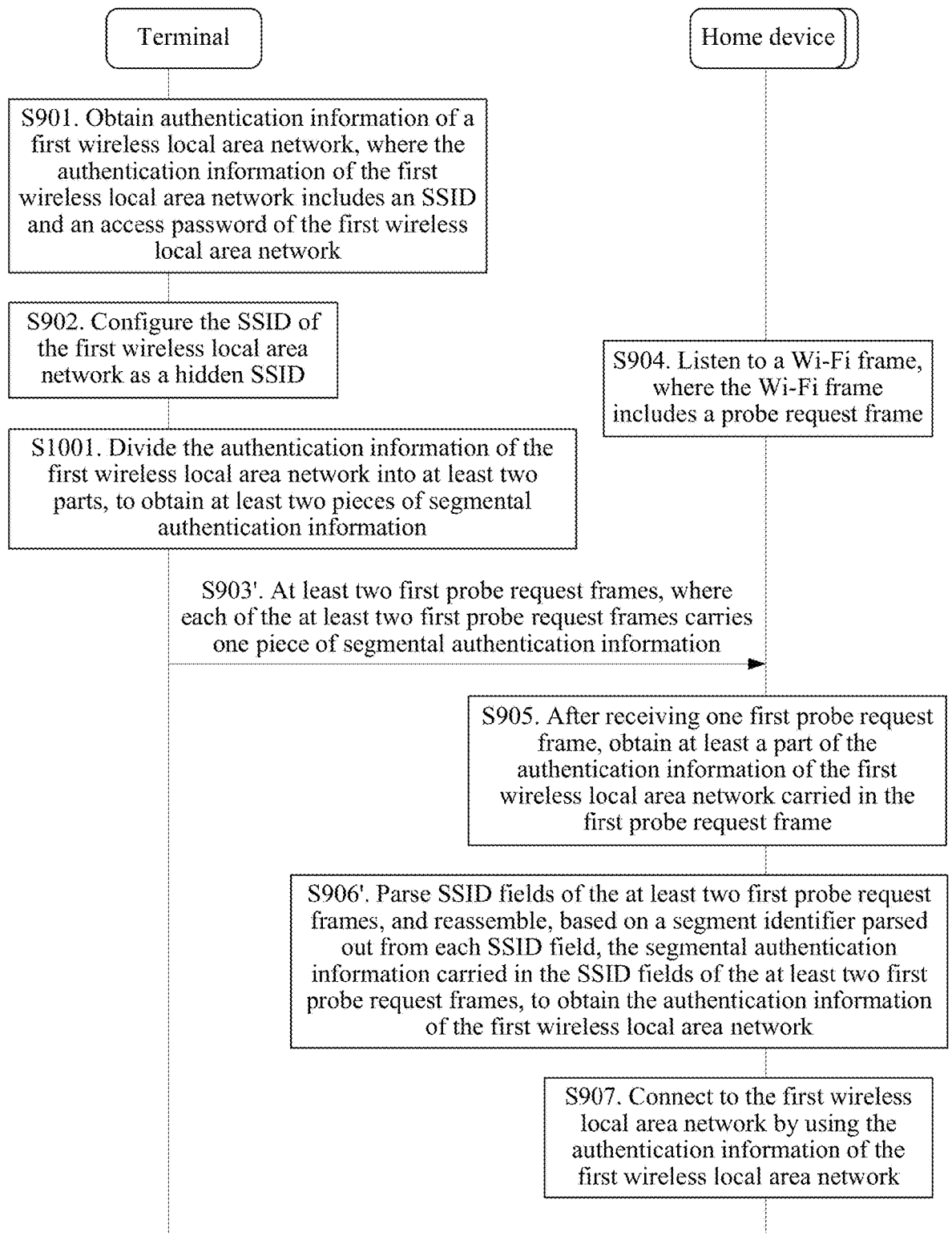
FIG. 10 is a flowchart 2 of a wireless local area network configuration method according to this application.

In this case, as shown in FIG. 10, before S903 shown in FIG. 9 and after S901 shown in FIG. 9, the method in this application may further include S1001, S903 shown in FIG. 9 may be replaced with S903', and S906 shown in FIG. 9 may be replaced with S906'.

S1001. The terminal divides the authentication information of the first wireless local area network into at least two parts, to obtain at least two pieces of segmental authentication information.

S903'. The terminal sends at least two first probe request frames, where each of the at least two first probe request frames carries one piece of segmental authentication information.

The at least two first probe request frames are in a one-to-one correspondence with the at least two pieces of segmental authentication information. In other words, a quantity of probe request frames in the at least two first probe request frames is the same as a quantity of pieces of segmental authentication information in the at least two pieces of segmental authentication information, and each of one first probe request frame carries one piece of segmental authentication information.

Specifically, the segmental authentication information is carried in the SSID field of the first probe request frame.

S906'. The home device parses SSID fields of the at least two first probe request frames, and reassembles, based on a segment identifier parsed out from each SSID field, the segmental authentication information carried in the SSID fields of the at least two first probe request frames, to obtain the authentication information of the first wireless local area network.

For example, it is assumed that the authentication information of the first wireless local area network is 60-byte data, for example, "xxxxxxxxxxxxxxxxxxxxxxxxxxxxxxxxxxxxyyyyyyyyyyyyyyyy yyyyyyyyyyyyyy" In this case, an SSID field of one first probe request frame is insufficient to carry 48-byte data, and the terminal may divide the authentication information of the first wireless local area network into two segments: "xxxxxxxxxxxxxxxxxxxxxxxxxxxxxxxx" and "yyyyyyyyyyyyyyyyyy".
"xxxxxxxxxxxxxxxxxxxxxxxxxxxxxxxx" may be carried in an SSID field 1 of a first probe request frame 1, and "yyyyyyyyyyyyyyyyyyyyyyyyyyyy" may be carried in an SSID field 2 of a first probe request frame 2.

It is assumed that the feature code of the terminal may be one-byte information d, a segment identifier of "xxxxxxxxxxxxxxxxxxxxxxxxxxxxxxxx" is a digit 1, and a segment identifier of "yyyyyyyyyyyyyyyyyy" is a digit 2. In this case, information included in the SSID field 1 and the SSID field 2 is as follows:

The SSID field 1 includes "1dxxxxxxxxxxxxxxxxxxxxxxxxxxxxxxxx".

The SSID field 2 includes "2dyyyyyyyyyyyyyyyyyyyyyyyyyyyyyy".

After receiving the first probe request frame 1 and the first probe request frame 2, the home device may determine, based on the feature code "d" in the SSID field 1 and the SSID2, that the two probe request frames are probe request frames sent by the terminal; determine, based on the segment identifier "1" in the SSID field 1, that the segmental authentication information "xxxxxxxxxxxxxxxxxxxxxxxxxxxxxxxx" included in the SSID field 1 is a first part of the authentication information of the first wireless local area network; and determine, based on the segment identifier "2" in the SSID field 2, that the segmental authentication information "yyyyyyyyyyyyyyyyyyyyyyyyyyyy" included in the SSID field 2 is a second part of the authentication information of the first wireless local area network. Then, the home device may reassemble the segmental authentication information in the two SSID fields based on the segment identifiers in the two SSID fields, to obtain the authentication information of the first wireless local area network.

Certainly, if an SSID field of one probe request frame is sufficient to carry the authentication information of the first wireless local area network, the terminal may send only one first probe request frame, where an SSID of the first probe request frame includes the authentication information of the first wireless local area network.

In this application, when an SSID field of one probe request frame is insufficient to transmit the complete "authentication information of the first wireless local area network", the authentication information of the first wireless local area network may be segmented and transmitted in SSID fields of a plurality of probe request frames. The home device only needs to reassemble information in the plurality of SSID fields based on segment identifiers in the SSID fields, to obtain the authentication information of the first wireless local area network.

Figure 11:
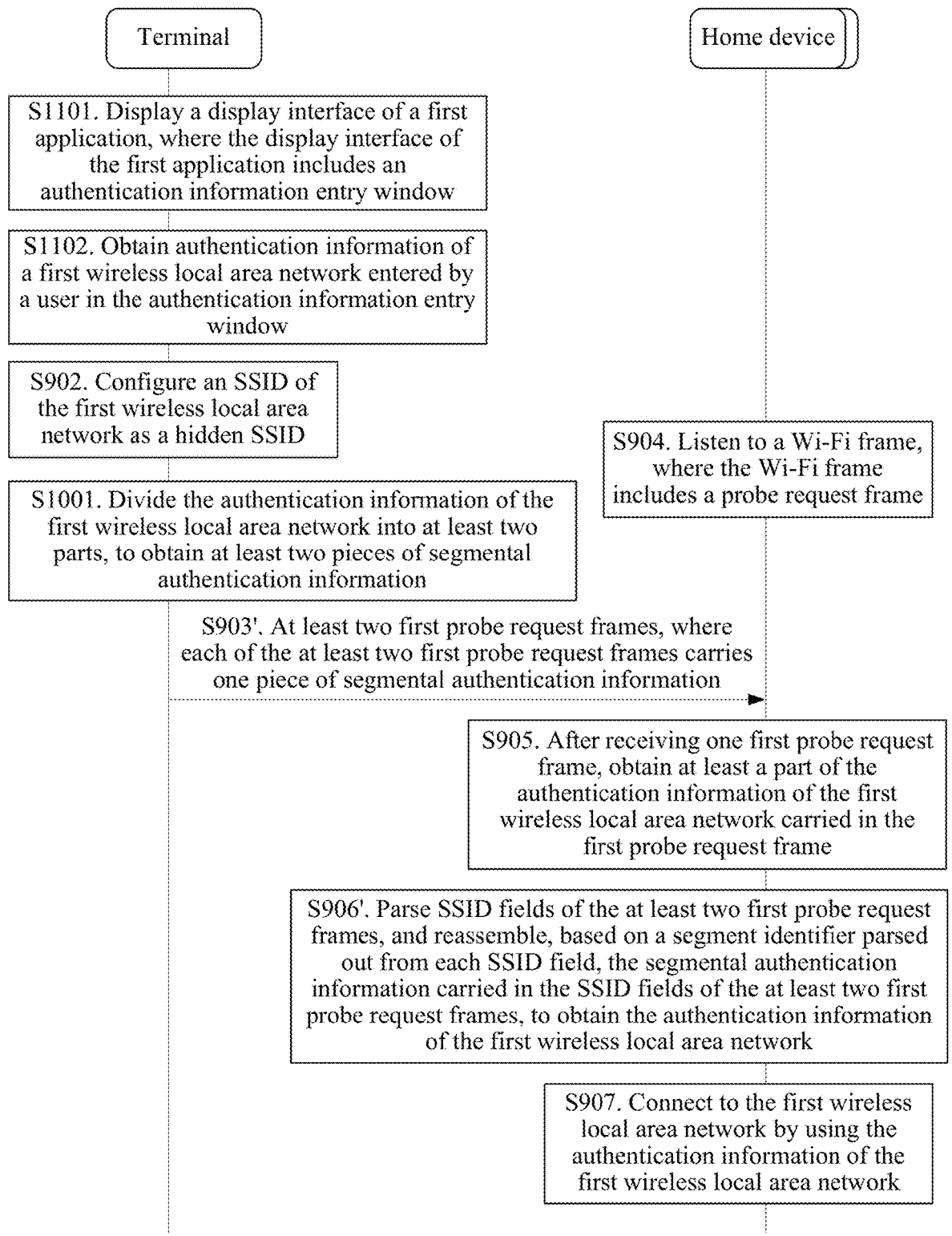
FIG. 11 is a flowchart 3 of a wireless local area network configuration method according to this application.

In some embodiments, the terminal may receive the authentication information of the first wireless local area network entered by the user in a home app. In these embodiments, before S901, the method in this application may further include S1101. For example, as shown in FIG. 11, before S901 shown in FIG. 9, the method in this application may include S1101.

S1101. A terminal displays a display interface of a first application, where the display interface of the first application includes an authentication information entry window.

The terminal may display the display interface of the first application in response to a first instruction, where the first instruction may be a start instruction for the first application.

Figure 12:
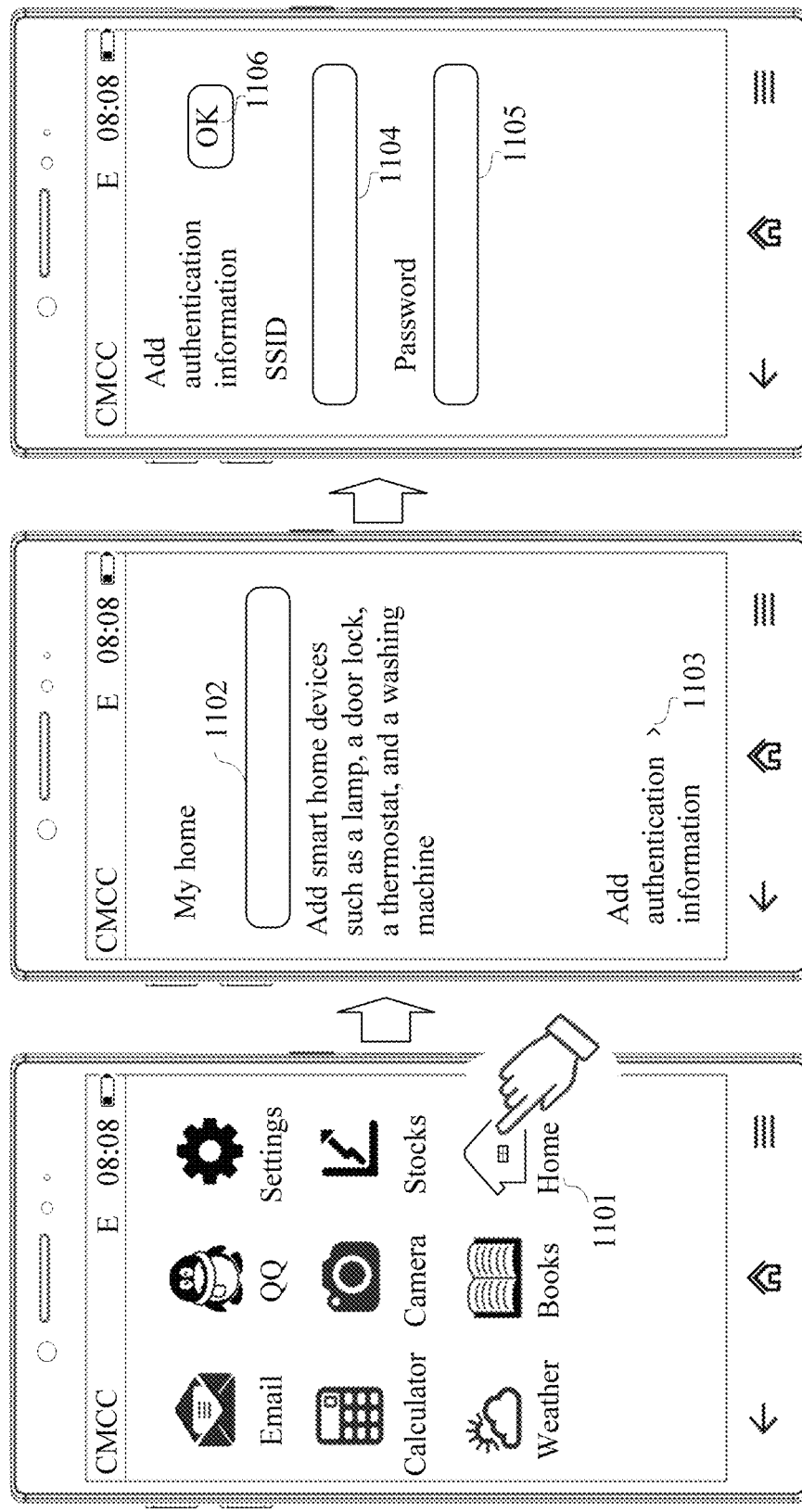
FIG. 12A to FIG. 12C are a schematic diagram 1 of an example of a display interface of a terminal according to this application.

For example, the first application in this application may be an application corresponding to a "Home" icon 1101 shown in FIG. 12A. As shown in FIG. 12A, after the user taps the "Home" icon 1101, the terminal may display a display interface shown in FIG. 12B, and the display interface shown in FIG. 12B includes a "window 1102 for adding a home device" and an "Add authentication information"

option 1103. The terminal may receive an identifier of a to-be-added home device entered by the user in the "window 1102 for adding a home device".

After the user taps the "Add authentication information" option 1103, the terminal may display a display interface shown in FIG. 12C, and the display interface shown in FIG. 12C includes the authentication information entry window. As shown in FIG. 12C, the authentication information entry window may include an "SSID entry window" 1104, an "access password entry window" 1105, and an "OK" button 1106 that are shown in FIG. 12B. The "SSID entry window" 1104 is used for entering an SSID of a home wireless local area network (such as the first wireless local area network), the "access password entry window" 1105 is used for entering an access password of the home wireless local area network, and the "OK" button 1106 is used for confirming the entered SSID and access password.

Correspondingly, as shown in FIG. 11, S901 shown in FIG. 9 may be replaced with S1102.

S1102. The terminal obtains authentication information of a first wireless local area network entered by a user in the authentication information entry window.

Figure 13:
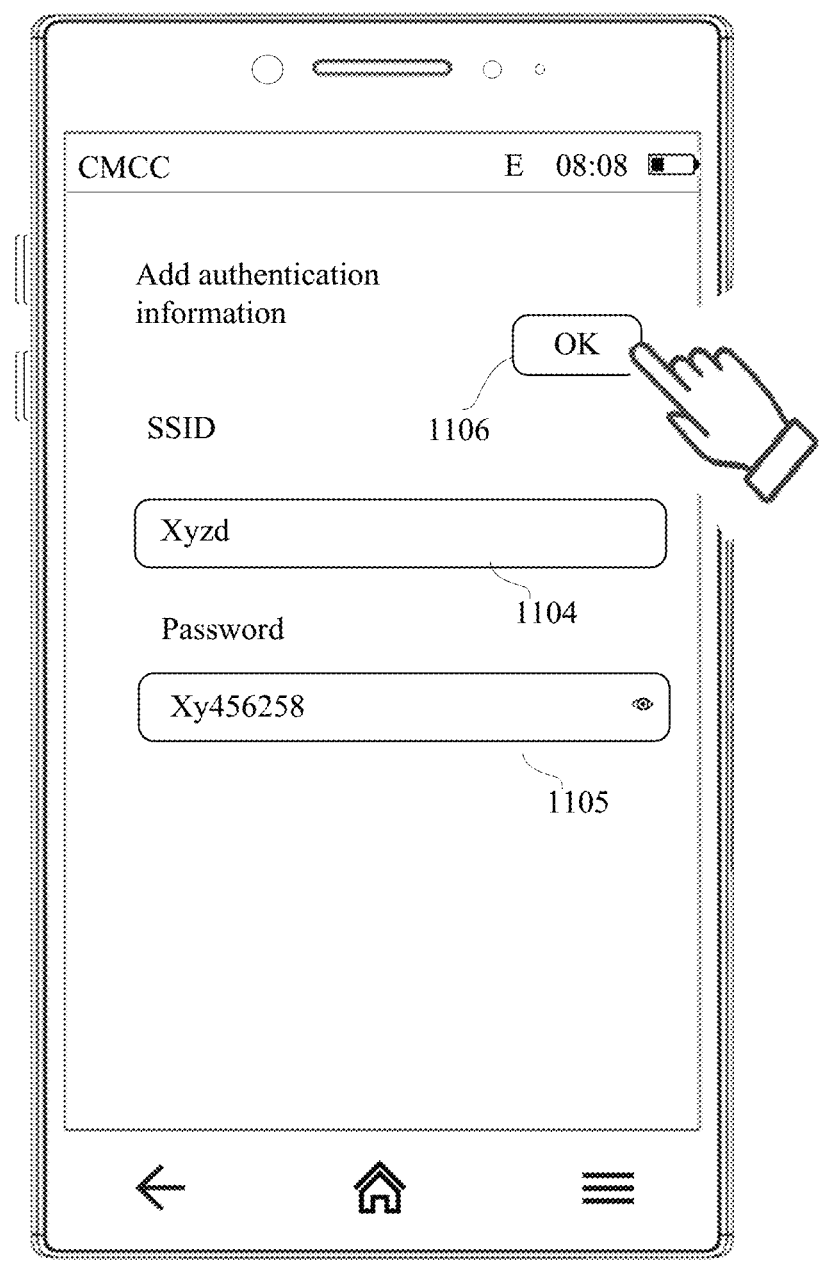
FIG. 13 is a schematic diagram 2 of an example of a display interface of a terminal according to this application.

For example, the terminal may obtain an SSID (such as Xyzd) entered by the user in an "SSID entry window" 1104 shown in FIG. 13, and obtain an access password (such as xy456258) entered by the user in an "access password entry window" 1105 shown in FIG. 13.

When the user taps an "OK" button 110 shown in FIG. 13, the terminal may perform S902 to configure the SSID of the first wireless local area network as the hidden SSID.

It should be noted that the terminal in this application may be a terminal including an Android operating system, or the terminal may be a terminal including an IOS operating system, or the terminal may be a terminal including another operating system. This is not limited in this application.

For example, the terminal may invoke an application programming interface (Application Programming Interface, API) provided by a Wi-Fi manager to implement functions such as "configuring the SSID of the first wireless local area network as the hidden SSID" and "associating with the first wireless local area network". config is a variable of a WifiConfiguration type.

The terminal may execute the following code, to configure the SSID of the first wireless local area network as the hidden SSID and set the access password of the first wireless local area network to be empty:

```
{
apConfig.hidden SSID=true;     //Hidden SSID
apConfig.allowdKeyManagement.set(WifiConfiguration.
KeyMgmt.NONE);
                              //Set the access password to be empty
}
```

The terminal may invoke a function netId=addNetwork (WifiConfiguration config) to add a description of the first wireless local area network, that is, write the SSID and the access password of the first wireless local area network into the SSID field of the first wireless local area network, and invoke a function enableNetwork (int netId, boolean attemptConnect) to attempt to associate with the first wireless local area network. After executing "enableNetwork(int netId, boolean attemptConnect)", the terminal may send the probe request frame whose SSID field carries "the SSID and the access password of the first wireless local area network".

Figure 14:
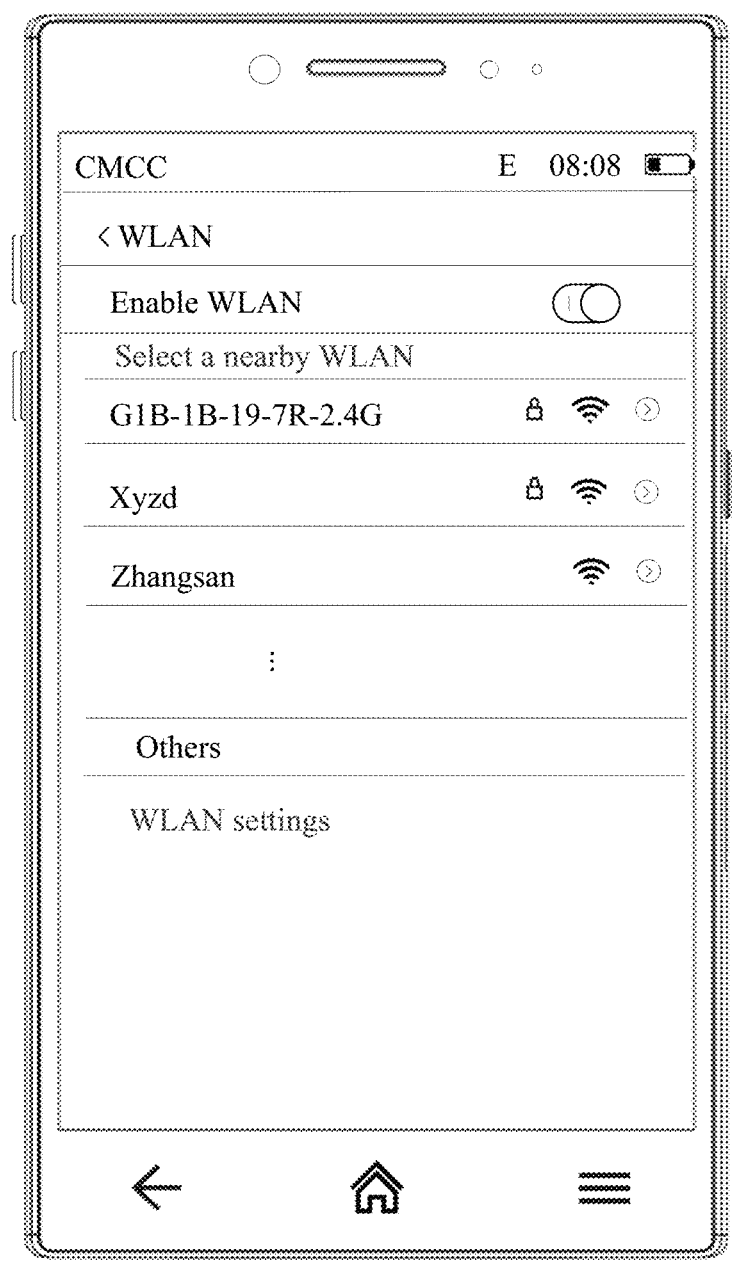
FIG. 14 is a schematic diagram 5 of an example of a Wi-Fi login interface of a terminal according to this application.

It can be understood that, after the user taps the "OK" button 1106 shown in FIG. 13, the terminal may display a Wi-Fi login interface shown in FIG. 14, so that the user can control, on the Wi-Fi login interface shown in FIG. 14, the terminal to connect to the first wireless local area network (for example, the Wi-Fi network whose SSID is Xyzd).

Because of a compatibility problem of the IOS operating system, an IOS terminal may not be able to directly use the authentication information of the first wireless local area network. Based on this, when the terminal is an IOS terminal, after obtaining the authentication information of the first wireless local area network, the IOS terminal may import, into the IOS system of the IOS terminal, an IOS description file including the authentication information of the first wireless local area network, so that the IOS terminal can use the authentication information of the first wireless local area network. The IOS description file is compatible with the IOS system of the IOS terminal. For example, the IOS description file may be a file whose name is suffixed with ".mobileco".

Figure 15A:
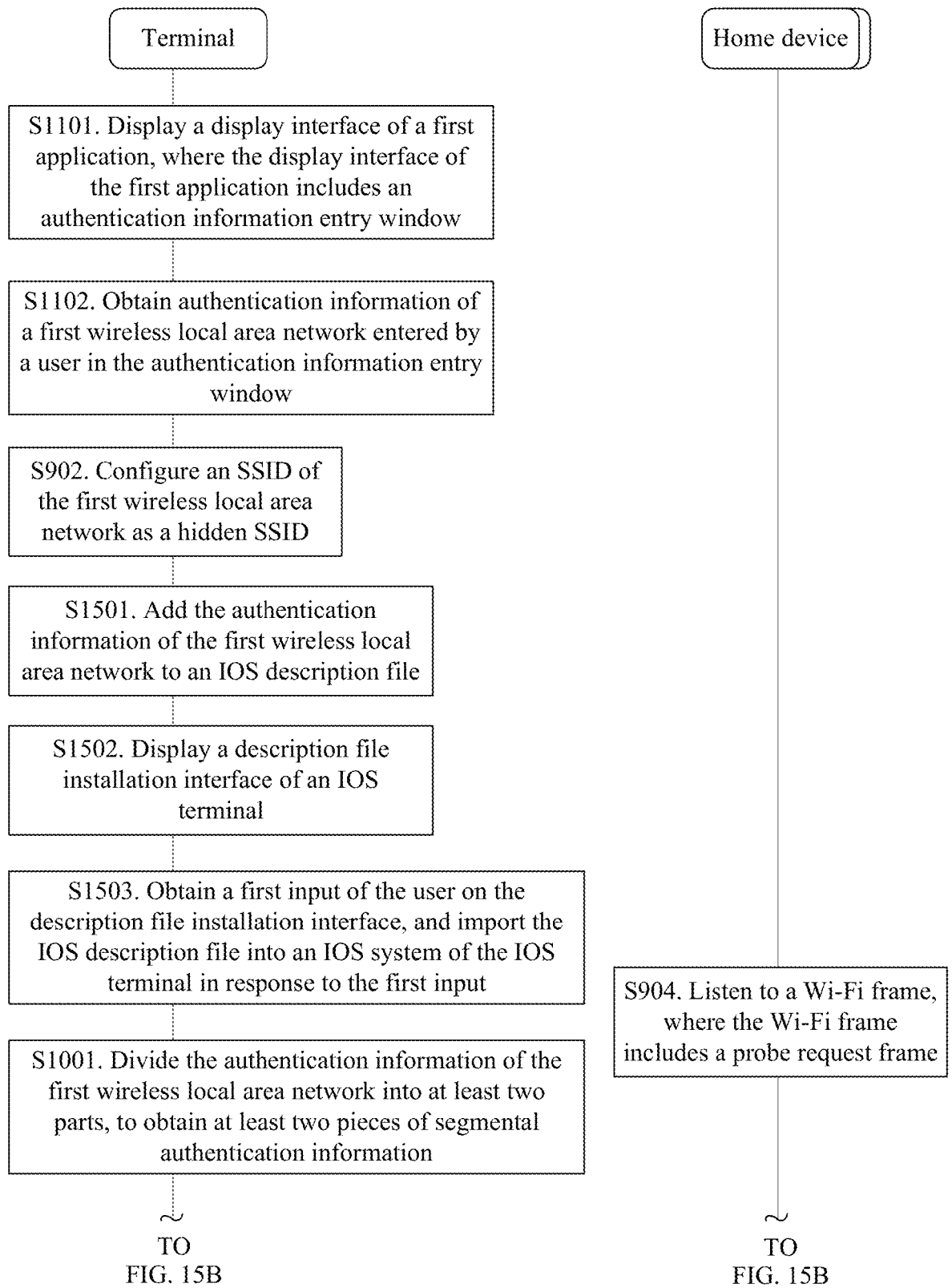

Specifically, after S901 or S1102 and before S903 or S903', the method in this application may further include S1501 to S1503. For example, as shown in FIG. 15A, after S1102 shown in FIG. 11 and before S903' shown in FIG. 11, the method in this application may further include S1501 to S1503.

S1501. The terminal adds the authentication information of the first wireless local area network to an IOS description file.

Figure 16C:
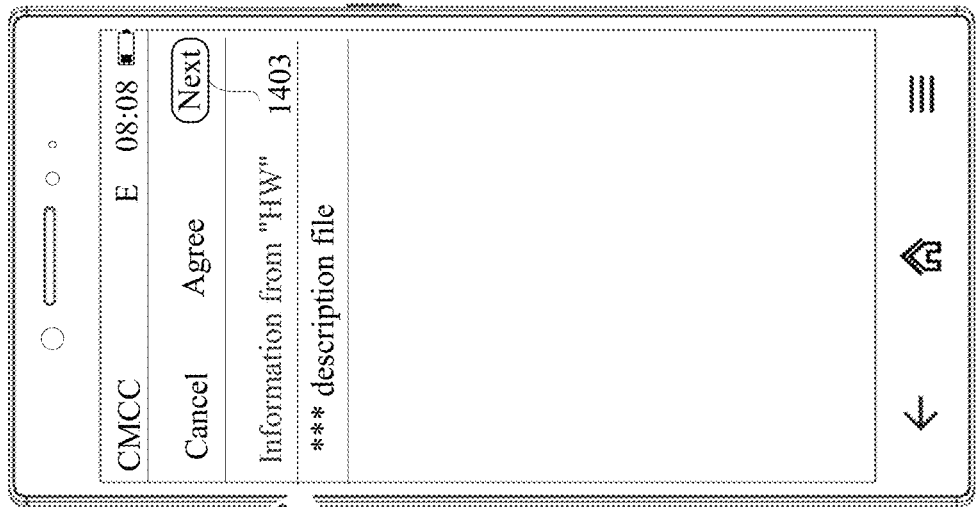
FIG. 16A to FIG. 16C are a schematic diagram 3 of an example of a display interface of a terminal according to this application.
Figure 16B:
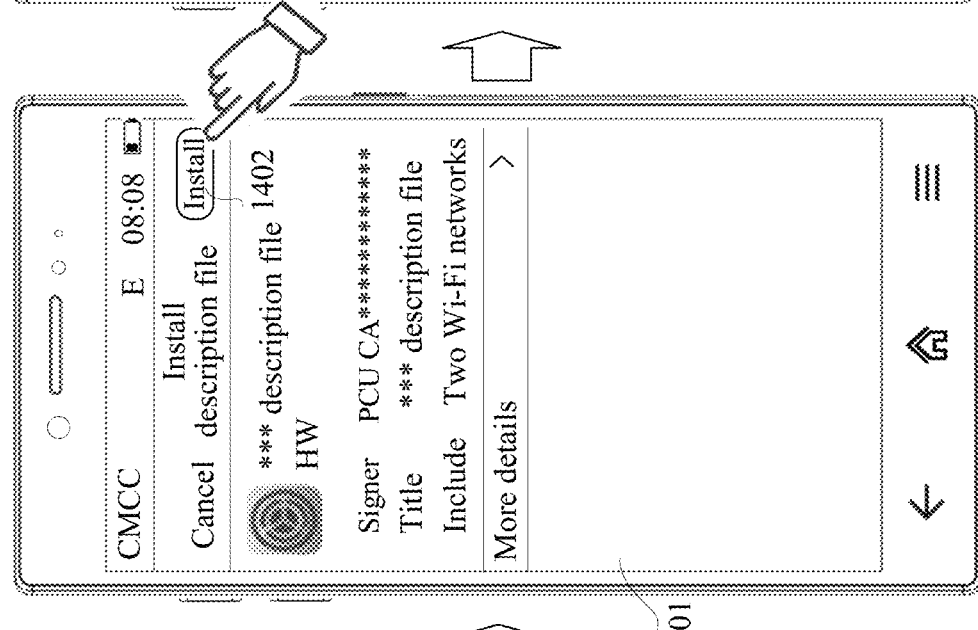
Figure 16A:
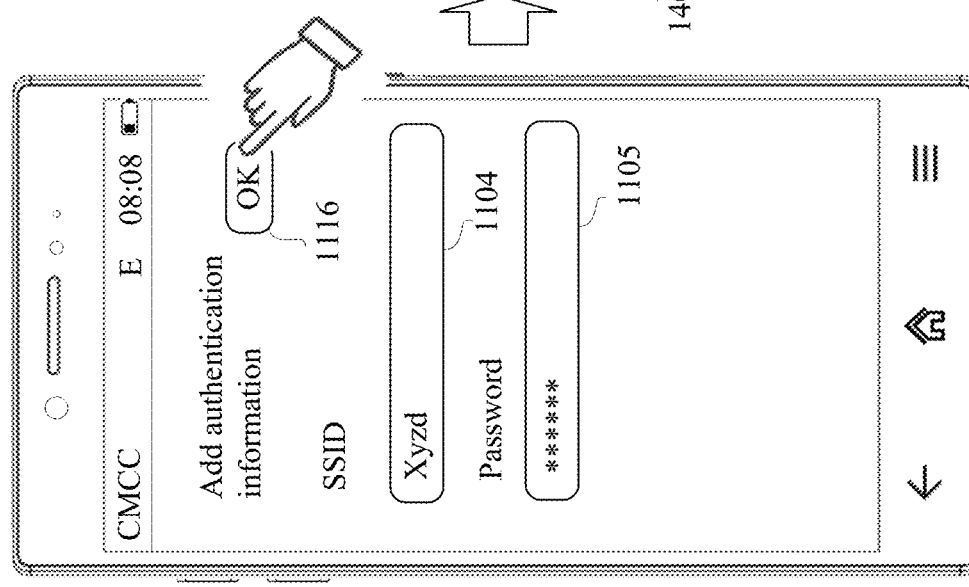

After the user taps an "OK" button 1106 shown in FIG. 16A (namely, FIG. 13), the terminal may add the authentication information of the first wireless local area network to the IOS description file.

S1502. The terminal displays a description file installation interface of the IOS terminal.

For example, after the user taps the "OK" button 1106 shown in FIG. 16A, the terminal may display a "description file installation interface" 1401, shown in FIG. 16B, of the terminal.

S1503. The terminal obtains a first input of the user on the description file installation interface, and imports the IOS description file into an IOS system of the IOS terminal in response to the first input.

For example, after the user taps an "Install" option 1402 on the "description file installation interface" 1401 in FIG. 16B, the terminal may display a display interface shown in FIG. 16C. After the user taps a "Next" option 1403 in FIG. 17A (namely, FIG. 16C), the terminal may display a display interface shown in FIG. 17B. After the user taps an "Install" option 1501 in FIG. 17B, the terminal performs the operation of "importing the IOS description file into an IOS system" in S1503.

Figure 17B:
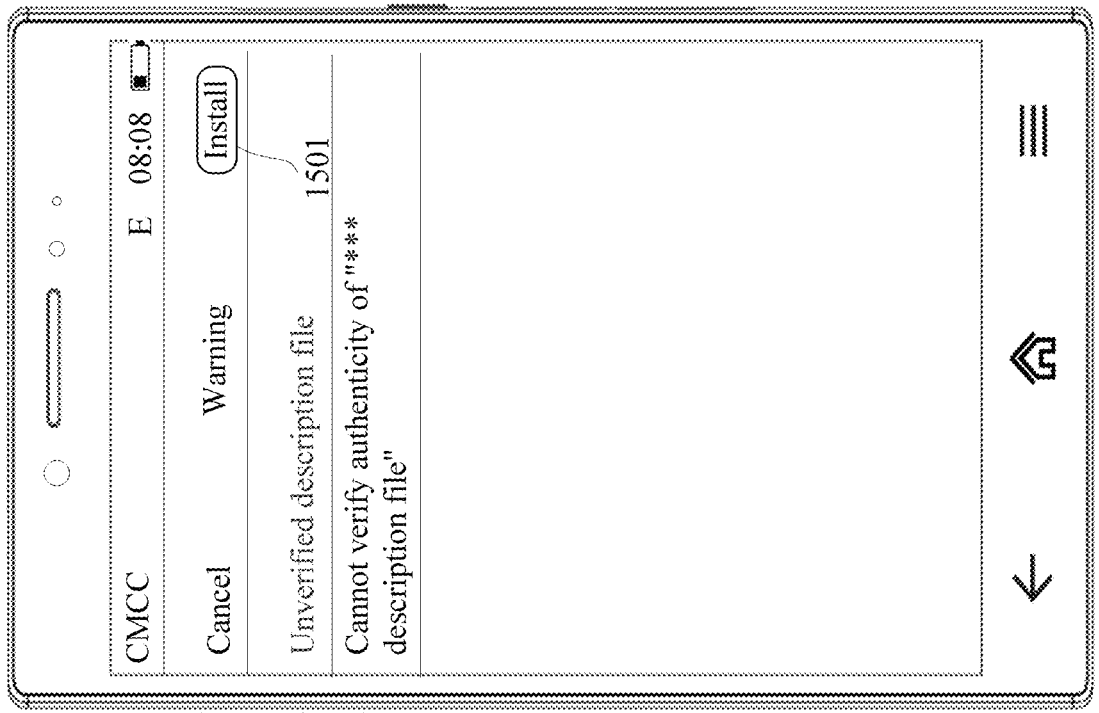
FIG. 17A and FIG. 17B are a schematic diagram 4 of an example of a display interface of a terminal according to this application.
Figure 17A:
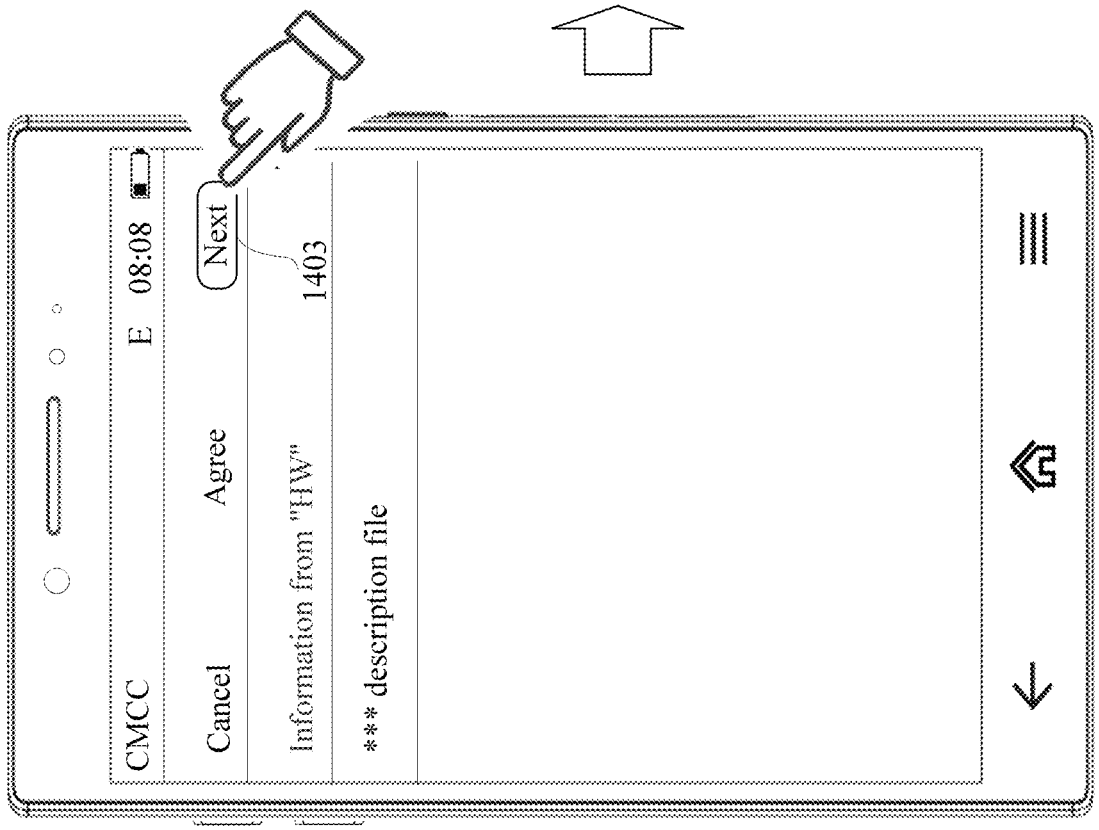

For example, the first input may include an instruction triggered by tapping the "Install" option 1402 in FIG. 16B by the user, an instruction triggered by tapping the "Next" option 1403 in FIG. 17A by the user, and an instruction triggered by tapping the "Install" option 1501 in FIG. 17B by the user.

Figure 18B:
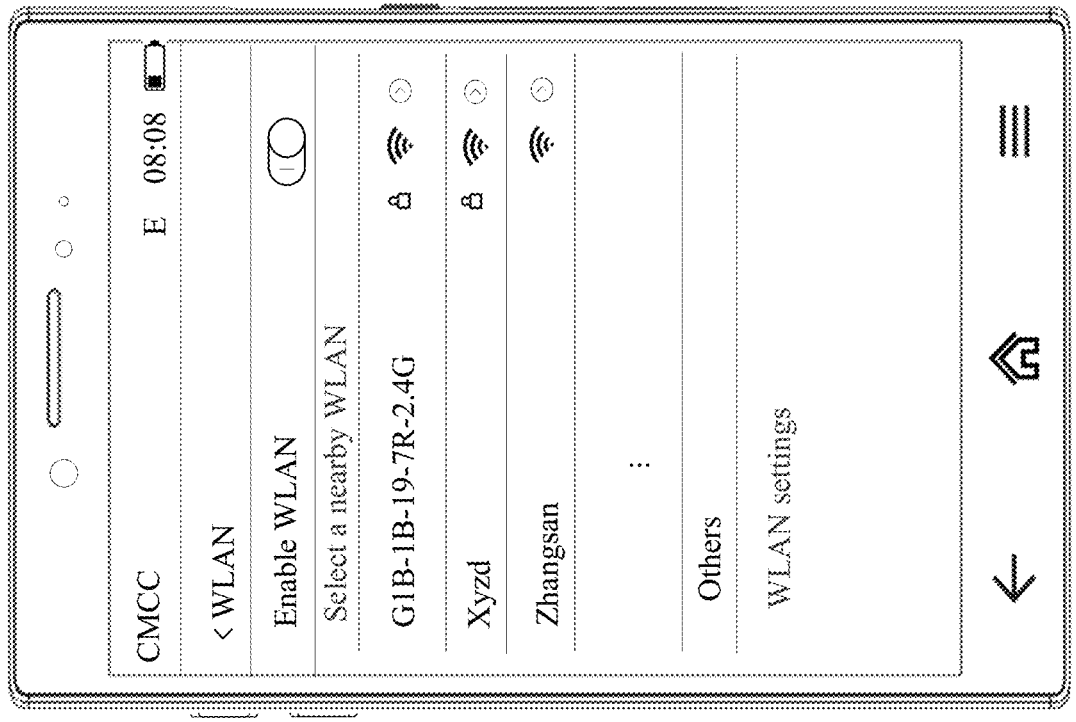
FIG. 18A and FIG. 18B are a schematic diagram 5 of an example of a display interface of a terminal according to this application.

It can be understood that, after the terminal receives the first input (for example, when the user taps an "Install" option 1501 in FIG. 18A), the terminal may display a Wi-Fi login interface shown in FIG. 18B, so that the user can control, on the Wi-Fi login interface shown in FIG. 18B, the terminal to connect to the first wireless local area network (such as Xyzd).

It can be understood that, regardless of whether the terminal is an Android terminal or an IOS terminal, the terminal may perform S902 when detecting that the user taps the "OK" button 1106 shown in FIG. 13, to configure the SSID of the first wireless local area network as the hidden SSID.

Figure 18A:
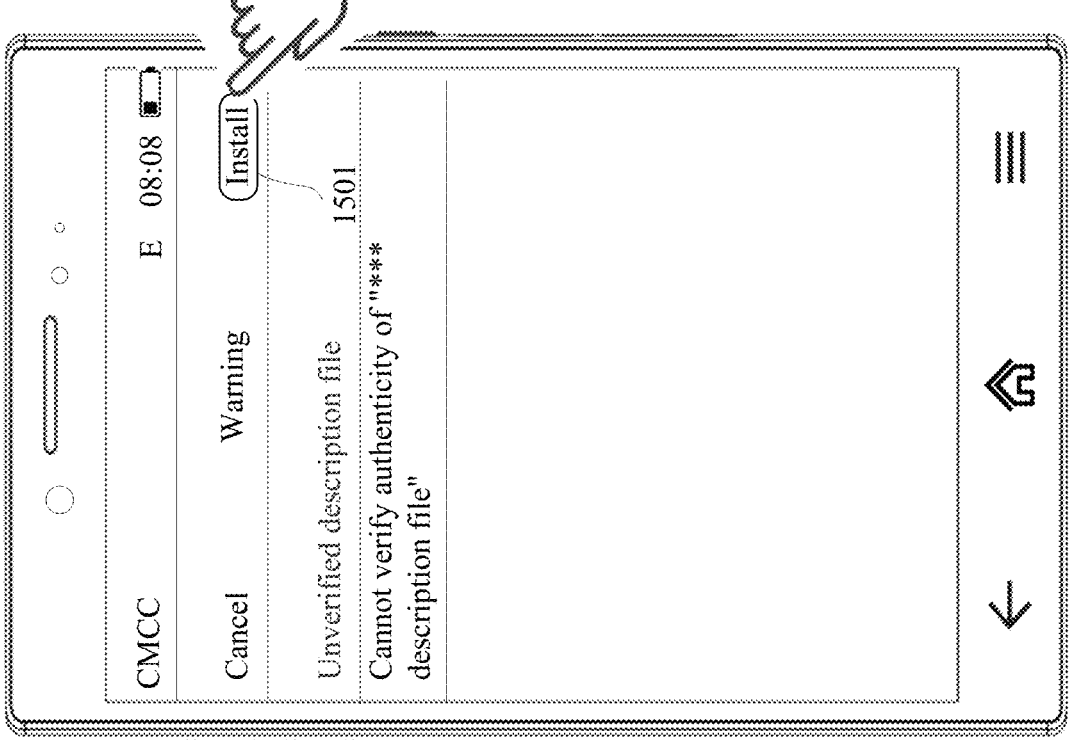

Alternatively, when the terminal is the IOS terminal, the terminal may further perform S902 when detecting that the user taps the "Install" option 1402 shown in FIG. 16B, to configure the SSID of the first wireless local area network as the hidden SSID; or may perform S902 when detecting that the user taps the "Next" option 1403 shown in FIG. 16C or the "Install" option 1501 shown in FIG. 18A, to configure the SSID of the first wireless local area network as the hidden SSID.

Further, after all home devices are connected to the first wireless local area network, the home device may send a network configuration success message to the terminal (the Android terminal, the IOS terminal, or another type of terminal) by using the first wireless local area network, to instruct the terminal to display a home app interface and communicate with the home device by using the first wireless local area network.

Figure 19:
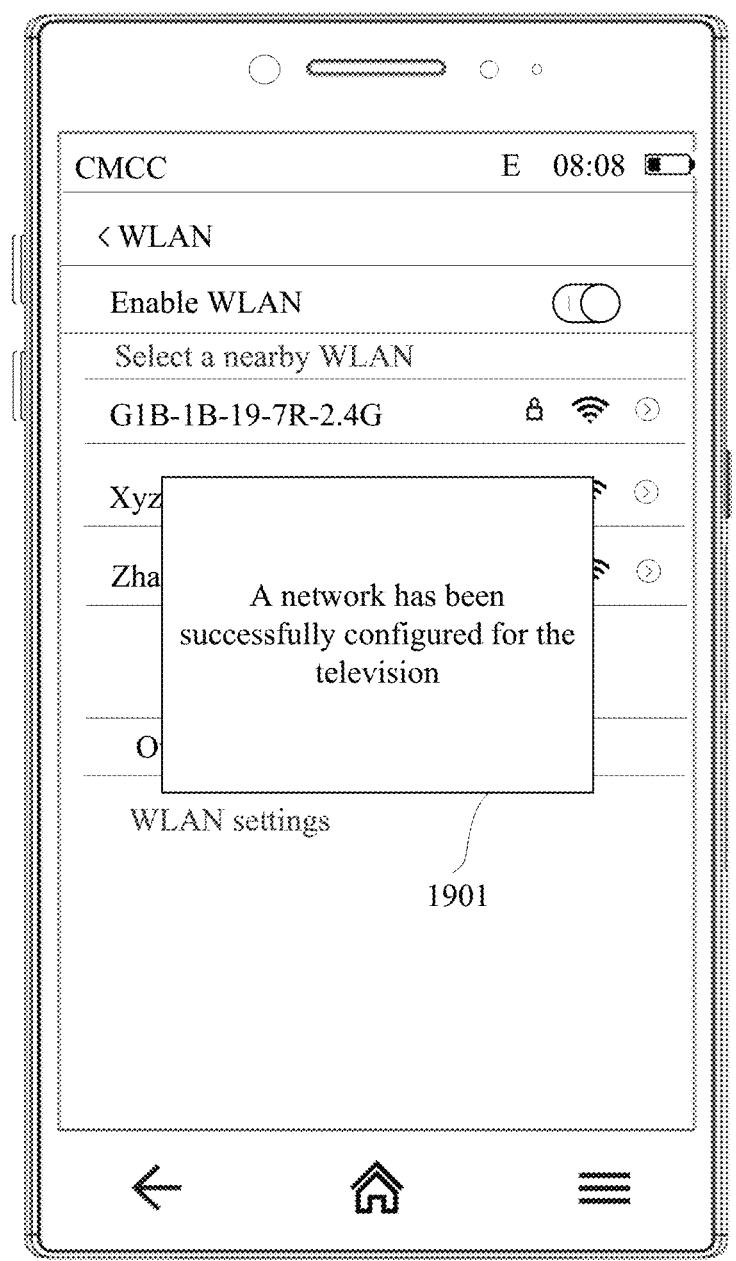
FIG. 19 is a schematic diagram 6 of an example of a display interface of a terminal according to this application.

For example, when the display interface shown in FIG. 14 and FIG. 18B is displayed, if the terminal receives the network configuration success message sent by the home device, a display interface shown in FIG. 19 may be displayed. The display interface shown in FIG. 19 includes a network configuration success prompt window 1901. The network configuration success prompt window 1901 may display prompt information such as "A network has been successfully configured for the television".

According to the wireless local area network configuration method provided in this application, the terminal can configure the authentication information of the first wireless local area network for the home device in a manner of "sending the Wi-Fi frame (probe request frame), where the SSID field of the probe request frame carries the authentication information of the first wireless local area network". The probe request frame sent by the terminal does not need to be forwarded by a wireless router, so that there is no impact on another data service on the wireless router.

In addition, the probe request frame is a Wi-Fi management frame, and a Wi-Fi module in any home device can listen to and receive the probe request frame. This can ensure that the home device can receive the probe request frame, and therefore can obtain the authentication information carried in the SSID field of the probe request frame, so as to connect to the first wireless local area network by using the authentication information. In other words, this application can increase a success rate of configuring authentication information of a home wireless local area network for a home device, and improve efficiency in connecting the home device to the home wireless local area network.

Figure 20:
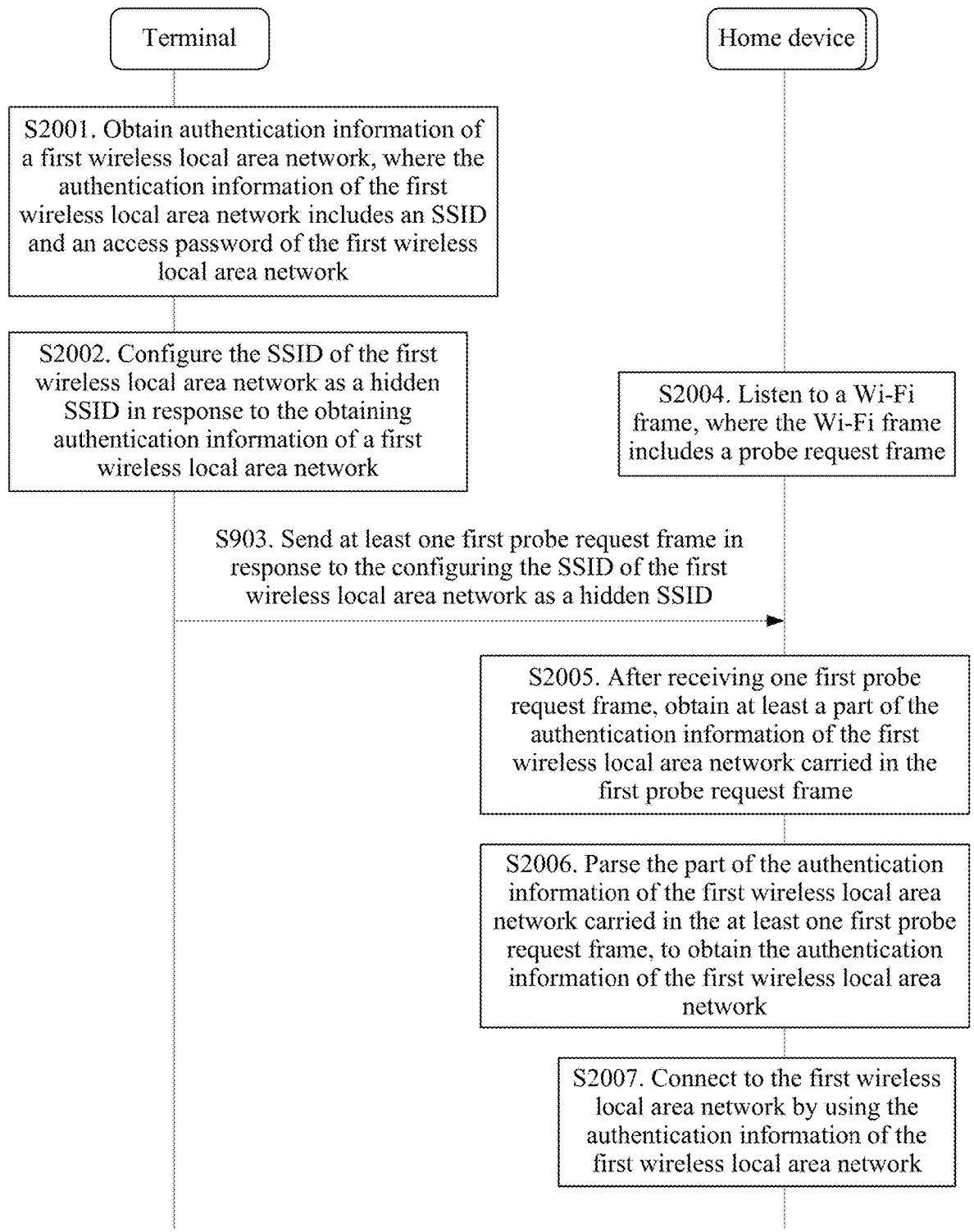
FIG. 20 is a flowchart 5 of a wireless local area network configuration method according to this application.

This application provides a wireless local area network configuration method. As shown in FIG. 20, the wireless local area network configuration method includes S2001 to S2007.

S2001. A terminal obtains authentication information of a first wireless local area network, where the authentication information of the first wireless local area network includes an SSID and an access password of the first wireless local area network.

For a specific method used by the terminal to obtain the authentication information of the first wireless local area network, refer to the detailed description of S901 in this application. Details are not described herein in this application again.

S2002. The terminal configures the SSID of the first wireless local area network as a hidden SSID in response to the obtaining authentication information of a first wireless local area network.

The terminal may configure the SSID of the first wireless local area network as the hidden SSID in response to the operation of "obtaining authentication information of a first wireless local area network" in S2001. For example, after a user enters the "authentication information of the first wireless local area network" in the authentication information entry window shown in FIG. 13, when the user taps the "OK" button 1106 shown in FIG. 13, the terminal may obtain the authentication information of the first wireless local area network. In this case, the terminal may perform the operation of "configuring the SSID of the first wireless local area network as a hidden SSID" in S2002 in response to the operation of "obtaining authentication information of a first wireless local area network" by the terminal.

S2003. The terminal sends at least one first probe request frame in response to the configuring the SSID of the first wireless local area network as a hidden SSID, where the first probe request frame carries at least a part of the authentication information of the first wireless local area network.

The terminal may send the at least one first probe request frame in response to the operation of "configuring the SSID of the first wireless local area network as a hidden SSID" in S2002. For example, when the user taps the "Install" button 1501 shown in FIG. 18A, the terminal may configure the SSID of the first wireless local area network as the hidden SSID, and then send the at least one first probe request frame in response to the configuring the SSID of the first wireless local area network as a hidden SSID.

S2004. A home device listens to a Wi-Fi frame, where the Wi-Fi frame includes a probe request frame.

S2005. After receiving one first probe request frame, the home device obtains the at least a part of the authentication information of the first wireless local area network carried in the first probe request frame.

S2006. The home device parses the part of the authentication information of the first wireless local area network carried in the at least one first probe request frame, to obtain the authentication information of the first wireless local area network.

S2007. The home device connects to the first wireless local area network by using the authentication information of the first wireless local area network.

It should be noted that, for detailed descriptions of S2004 to S2007 in this application, reference may be made to the related descriptions of S904 to S907 in this application. Details are not described herein in this application again.

Further, before S2003 shown in FIG. 20 and after S2001 shown in FIG. 20, the method in this application may further include S2101, S2003 may be replaced with S2003', and S2006 may be replaced with S2006'.

S2101. The terminal divides the authentication information of the first wireless local area network into at least two parts in response to the obtaining authentication information of a first wireless local area network, to obtain at least two pieces of segmental authentication information.

For a method for "dividing, by the terminal, the authentication information of the first wireless local area network into at least two parts, to obtain at least two pieces of segmental authentication information" in this application, refer to the detailed description of S1001 in this application. Details are not described herein in this application again.

S2003'. The terminal sends at least two first probe request frames in response to the configuring the SSID of the first wireless local area network as a hidden SSID, where each of the at least two first probe request frames carries one piece of segmental authentication information.

For detailed descriptions of that "the terminal sends at least two first probe request frames" and that "each of the at least two first probe request frames carries one piece of segmental authentication information" in this application, refer to the detailed description of S903' in this application. Details are not described herein in this application again.

S2006'. The home device parses SSID fields of the at least two first probe request frames, and reassembles, based on a segment identifier parsed out from each SSID field, the segmental authentication information carried in the SSID fields of the at least two first probe request frames, to obtain the authentication information of the first wireless local area network.

For a detailed description of that "the home device parses SSID fields of the at least two first probe request frames, and reassembles, based on a segment identifier parsed out from each SSID field, the segmental authentication information carried in the SSID fields of the at least two first probe request frames, to obtain the authentication information of the first wireless local area network" in this application, refer to the detailed description of S906' in this application. Details are not described herein in this application again.

According to the wireless local area network configuration method provided in this application, in a Wi-Fi standard, for a wireless local area network with a hidden SSID, a probe request frame may carry the SSID of the wireless local area network. Based on this stipulation in the Wi-Fi standard, the terminal may configure the SSID of the first wireless local area network as the hidden SSID after obtaining the authentication information of the first wireless local area network. In this case, the terminal may send a probe request frame (namely, a probe request frame or the first probe request frame) carrying the authentication information of the first wireless local area network.

The probe request frame sent by the terminal does not need to be forwarded by a wireless router, so that there is no impact on another data service on the wireless router. In addition, the probe request frame is a Wi-Fi management frame, and a Wi-Fi module in any home device can listen to and receive the probe request frame. This can ensure that the home device can receive the probe request frame, and therefore can obtain the SSID and the access password that are carried in the SSID field of the probe request frame, so as to connect to the first wireless local area network by using the SSID and the access password. In other words, this application can increase a success rate of configuring authentication information of a home wireless local area network for a home device, and improve efficiency in connecting the home device to the home wireless local area network.

The foregoing describes the solutions provided in the embodiments of this application mainly from a perspective of a process in which a terminal configures a wireless local area network for a home device. It can be understood that, to implement the foregoing functions, the terminal includes a corresponding function module for performing each of the functions. A person skilled in the art should be easily aware that terminals and algorithm steps in the examples described with reference to the embodiments disclosed in this specification can be implemented in a form of hardware or in a form of a combination of hardware and computer software in this application. Whether a function is performed by hardware or computer software driving hardware depends on particular applications and design constraints of the technical solutions. A person skilled in the art may use different methods to implement the described functions for each particular application, but it should not be considered that the implementation goes beyond the scope of this application.

The embodiments of this application provide a terminal to implement the foregoing method embodiments. Specifically, the terminal may be divided based on the foregoing method examples. For example, modules or units corresponding to various functions may be obtained through division, or two or more functions may be integrated into one processing module. The integrated module may be implemented in a form of hardware, or may be implemented in a form of a software module or unit. The module or unit division in the embodiments of this application is an example, and is merely logical function division. There may be another division manner in actual implementation.

Figure 21:
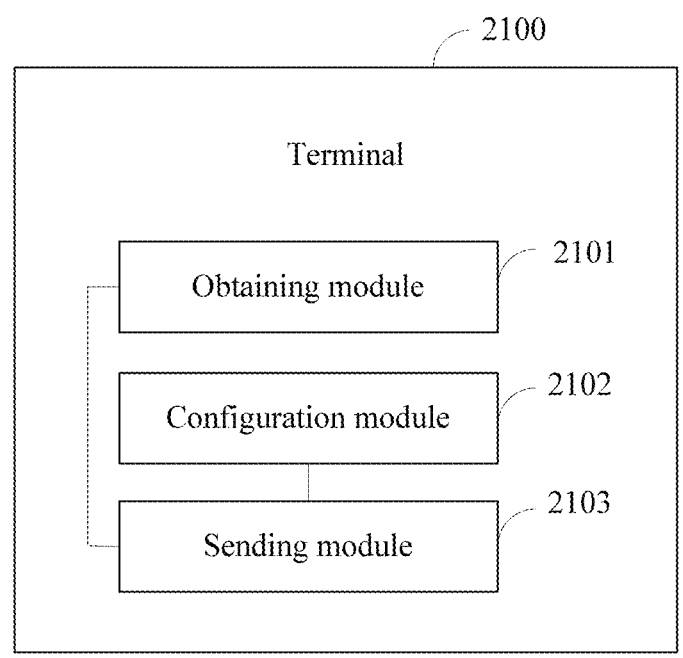
FIG. 21 is a schematic diagram 1 of structural composition of a terminal according to this application.

FIG. 21 is a possible schematic structural diagram of a terminal in the foregoing embodiments. As shown in FIG. 21, the terminal 2100 may include an obtaining module 2101, a configuration module 2102, and a sending module 2103.

The obtaining module 2101 is configured to support S901, S1102, the operation of "receiving the first input" in S1503, and S2001 in the method embodiments, and/or is used for another process of the technology described in this specification.

The configuration module 2102 is configured to support S902 and S2002 in the method embodiments, and/or is used for another process of the technology described in this specification.

The sending module 2103 is configured to support S903, S903', and S2003 in the method embodiments, and/or is used for another process of the technology described in this specification.

Figure 22:
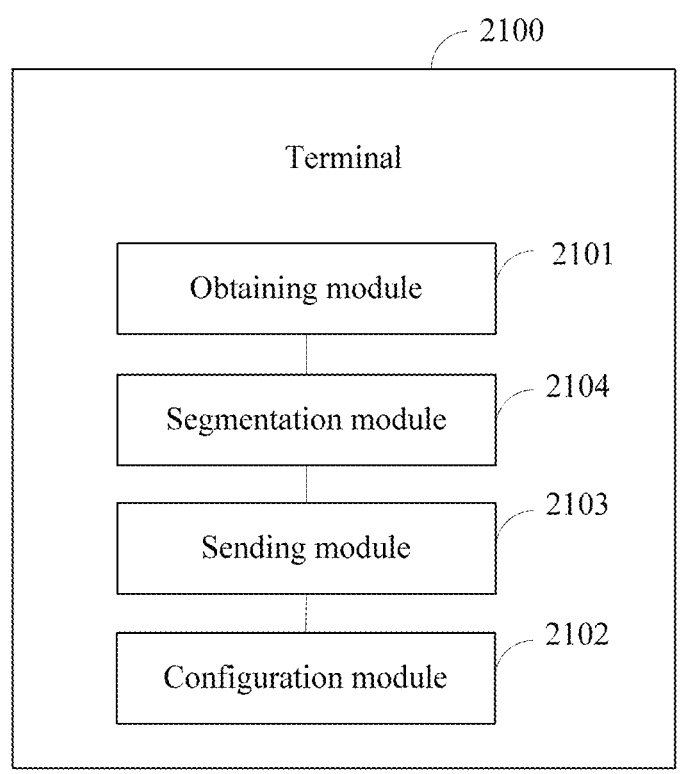
FIG. 22 is a schematic diagram 2 of structural composition of a terminal according to this application.

Further, as shown in FIG. 22, the terminal 2100 may further include a segmentation module 2104. The segmentation module 2104 is configured to support S1001 in the method embodiments, and/or is used for another process of the technology described in this specification.

Figure 23:
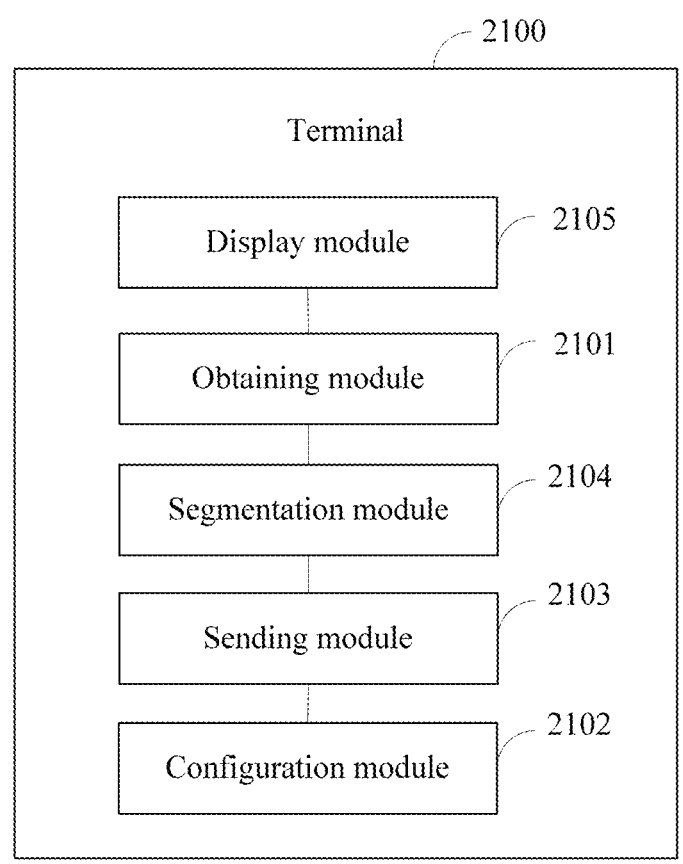
FIG. 23 is a schematic diagram 3 of structural composition of a terminal according to this application.

Further, as shown in FIG. 23, the terminal 2100 may further include a display module 2105. The display module 2105 is configured to support S1101 and S1502 in the method embodiments, and/or is used for another process of the technology described in this specification.

Further, the terminal 2100 may further include an adding module and an importing module. The adding module is configured to support S1501 in the method embodiments, and/or is used for another process of the technology described in this specification. The importing module is configured to support the operation of "importing the IOS description file into an IOS system of the IOS terminal" in S1503 in the method embodiments, and/or is used for another process of the technology described in this specification.

Further, the terminal 2100 may further include a storage module. The storage module is configured to store authentication information and the like of a first wireless local area network, and/or is used for another process of the technology described in this specification.

Certainly, the terminal 2100 includes but is not limited to the unit modules listed above. For example, the terminal 2100 may further include a receiving module for receiving data or a signal sent by another device, and the like. In addition, functions that can be specifically implemented by the foregoing modules also include but are not limited to the functions corresponding to the method steps described in the foregoing embodiments. For detailed descriptions of another unit of the terminal 2100 and each unit of the terminal 2100, refer to a detailed description of a method step corresponding to the unit. Details are not described herein in this embodiment of this application again.

As shown in FIG. 21, the terminal 2100 may include an obtaining module 2101, a configuration module 2102, and a sending module 2103.

The obtaining module 2101 is configured to support the operation of "receiving the first input" in S2001 in the method embodiments, and/or is used for another process of the technology described in this specification.

The configuration module 2102 is configured to support S2002 in the method embodiments, and/or is used for another process of the technology described in this specification.

The sending module 2103 is configured to support S2003 and S2003' in the method embodiments, and/or is used for another process of the technology described in this specification.

Further, as shown in FIG. 22, the terminal 2100 may further include a segmentation module 2104. The segmentation module 2104 is configured to support S2101 in the method embodiments, and/or is used for another process of the technology described in this specification.

Further, as shown in FIG. 23, the terminal 2100 may further include a display module 2105. The display module 2105 is configured to: display a display interface of a first application, where the display interface of the first application includes an authentication information entry window; and display a description file installation interface of the IOS terminal.

Further, the terminal 2100 may further include a storage module. The storage module is configured to store authentication information and the like of a first wireless local area network, and/or is used for another process of the technology described in this specification.

Certainly, the terminal 2100 includes but is not limited to the unit modules listed above. For example, the terminal 2100 may further include a receiving module for receiving data or a signal sent by another device, and the like. In addition, functions that can be specifically implemented by the foregoing modules also include but are not limited to the functions corresponding to the method steps described in the foregoing embodiments. For detailed descriptions of another unit of the terminal 2100 and each unit of the terminal 2100, refer to a detailed description of a method step corresponding to the unit. Details are not described herein in this embodiment of this application again.

When an integrated unit is used, the obtaining module 2101, the configuration module 2102, the adding module, the importing module, and the like may be integrated into one processing unit for implementation. The processing unit may be a processor or a controller, for example, may be a CPU, a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various logical blocks, modules, and circuits that are described as examples with reference to content disclosed in this application. The processing unit may alternatively be a combination implementing a computing function, for example, a combination including one or more microprocessors or a combination of a DSP and a microprocessor. The storage module may be a memory.

Figure 24:
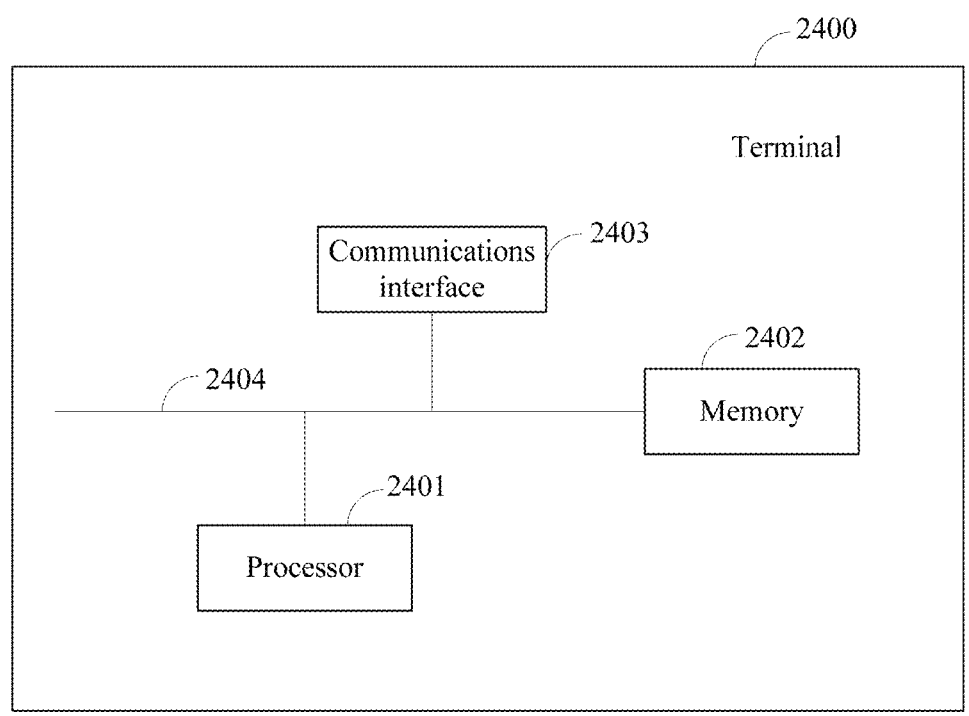
FIG. 24 is a schematic diagram 4 of structural composition of a terminal according to this application.

When the processing unit is a processor, the storage module is a memory, and the sending module is a communications interface, the terminal 2100 in this embodiment of this application may be a terminal 2400 shown in FIG. 24. As shown in FIG. 23, the terminal 2400 includes a processor 2401, a memory 2402, and a communications interface 2403. The processor 2401, the memory 2402, and the communications interface 2403 are connected to each other by using a bus 2404.

The memory 2402 is configured to store computer program code, and the computer program code includes an instruction. When the processor 2401 of the terminal 2400 executes the instruction, the terminal 2400 performs related method steps in any of FIG. 9, FIG. 10, FIG. 11, and FIG. 15A and FIG. 15B to implement the wireless local area network configuration method in the foregoing embodiments. The communications interface 2403 is configured to send a first probe request frame under control of the processor 2401.

The bus 2404 may be a Peripheral Component Interconnect (PCI) bus, an extended industry standard architecture (EISA) bus, or the like. The bus 2404 may be classified into an address bus, a data bus, a control bus, and the like. For ease of representation, the bus is represented by using only one bold line in FIG. 24. However, this does not mean that there is only one bus or only one type of bus.

Figure 25:
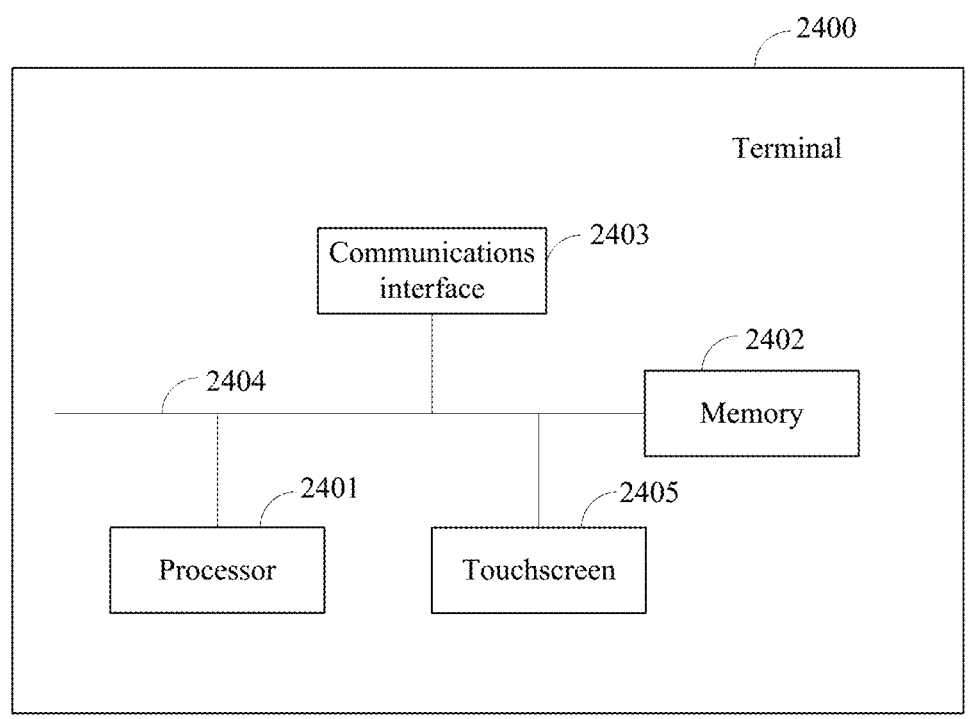
FIG. 25 is a schematic diagram 5 of structural composition of a terminal according to this application.

Further, as shown in FIG. 25, the terminal 24 may further include a touchscreen 2405. The touchscreen 2405 is configured to display, under control of the processor 2401, the GUIs shown in FIG. 3, FIG. 6A, FIG. 6B, FIG. 7, FIG. 12 to FIG. 14, and FIG. 16A to FIG. 19.

This application further provides a computer storage medium, and the computer storage medium stores computer program code. When the processor 2401 of the terminal 2400 executes the computer program code, the terminal 2400 performs related method steps in any of FIG. 9, FIG. 10, FIG. 11, FIG. 15A and FIG. 15B, and FIG. 20 to implement the wireless local area network configuration method in the foregoing embodiments.

The embodiments of the present invention further provide a computer program product. When the computer program product runs on a computer, the computer is enabled to perform related method steps in any of FIG. 9, FIG. 10, FIG. 11, FIG. 15A and FIG. 15B, and FIG. 20 to implement the wireless local area network configuration method in the foregoing embodiments.

Each of the terminal 2100, the terminal 2400, the computer storage medium, and the computer program product provided in the embodiments of the present invention is configured to execute a corresponding method provided above. Therefore, for beneficial effects that can be achieved, reference may be made to the beneficial effects of the corresponding method provided above. Details are not described herein in this application again.

The descriptions of the foregoing implementations allow a person skilled in the art to clearly understand that, for ease and brevity of description, division of only the foregoing function modules is used as an example for illustration. In actual application, the foregoing functions may be allocated to and implemented by different function modules depending on a requirement, that is, an inner structure of an apparatus is divided into different function modules to implement all or some of the functions described above. For detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiment is merely an example. For example, the module or unit division is only logical function division, and there may be another division manner in actual implementation. For example, a plurality of units or components may be combined or may be integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual needs, to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes various media that can store program code, such as a flash memory, a removable hard disk, a read-only memory, a random access memory, a magnetic disk, or an optical disc.

The foregoing descriptions are merely specific implementations of this application, and the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A method, implemented by a terminal, comprising:
   obtaining authentication information of a first wireless local area network, wherein the authentication information of the first wireless local area network comprises a service set identifier (SSID) and an access password of the first wireless local area network;
   configuring the SSID of the first wireless local area network as a hidden SSID; and
   sending at least one first probe request frame having at least a part of the authentication information of the first wireless local area network,
   wherein the first probe request frame further comprises a feature code, wherein the feature code is used by a home device to identify the terminal such that when the feature code included in the first probe request frame is different from a preset feature code, the home device discards the first probe request frame, and when the feature code included in the first probe request frame is same as the preset feature code, the home device determines that the first probe request frame is sent by the terminal.

2. The method according to claim 1, wherein the first probe request frame is not responded to by an access point that establishes the first wireless local area network.

3. The method according to claim 1, wherein an SSID field of the first probe request frame carries the at least a part of the authentication information of the first wireless local area network.

4. The method according to claim 1, wherein before sending the at least one first probe request frame, the method further comprises:
   dividing the authentication information of the first wireless local area network into at least two pieces of segmental authentication information, wherein
   the at least one first probe request frame comprises at least two second probe request frames, each of the at least two second probe request frames carries one of the at least two pieces of segmental authentication information respectively.

5. The method according to claim 1, wherein before obtaining authentication information of the first wireless local area network, the method further comprises:
   displaying a display interface of a first application, wherein the display interface of the first application comprises an authentication information entry window, wherein
   the obtaining authentication information of a first wireless local area network comprises:
   obtaining the authentication information of the first wireless local area network entered by a user through the authentication information entry window.

6. The method according to claim 5, wherein the terminal is an Internetwork Operating System (IOS) terminal; and
   after obtaining the authentication information of the first wireless local area network entered by a user through the authentication information entry window, and before sending the at least one first probe request frame, the method further comprises:
   adding the authentication information of the first wireless local area network to an IOS description file;
   displaying a description file installation interface of the IOS terminal; and
   obtaining a first input of the user on the description file installation interface, and importing the IOS description file into an IOS system of the IOS terminal in response to the first input.

7. An apparatus, comprising:
   at least one processor; and
   a memory coupled to the at least one processor and configured to store programming instructions that, when executed by the at least one processor, cause the apparatus to:
   obtain authentication information of a first wireless local area network, wherein the authentication information of the first wireless local area network comprises a service set identifier (SSID) and an access password of the first wireless local area network;
   configure the SSID of the first wireless local area network as a hidden SSID; and
   send at least one first probe request frame having at least a part of the authentication information of the first wireless local area network, wherein the first probe request frame further comprises a feature code, wherein the feature code is used by a home device to identify a terminal such that when the feature code included in the first probe request frame is different from a preset feature code, the home device discards the first probe request frame, and when the feature code included in the first probe request frame is same as the preset feature code, the home device determines that the first probe request frame is sent by the terminal.

8. The apparatus according to claim 7, wherein the first probe request frame is not responded to by an access point that establishes the first wireless local area network.

9. The apparatus according to claim 7, wherein an SSID field of the first probe request frame carries the at least a part of the authentication information of the first wireless local area network.

10. The apparatus according to claim 7, wherein the memory is further configured to store programming instructions that, when executed by the at least one processor, cause the apparatus to:
divide the authentication information of the first wireless local area network into at least two pieces of segmental authentication information, wherein
the at least one first probe request frame comprises at least two second probe request frames, each of the at least two second probe request frames carries one of the at least two pieces of segmental authentication information respectively.

11. The apparatus according to claim 7, wherein the memory is further configured to store programming instructions that, when executed by the at least one processor, cause the apparatus to:
display a display interface of a first application, wherein the display interface of the first application comprises an authentication information entry window, wherein
the obtaining authentication information of a first wireless local area network comprises:
obtaining the authentication information of the first wireless local area network entered by a user through the authentication information entry window.

12. The apparatus according to claim 11, wherein the apparatus is an Internetwork Operating System (IOS) apparatus; and
the memory is further configured to store programming instructions that, when executed by the at least one processor, cause the apparatus to:
add the authentication information of the first wireless local area network to an IOS description file;
display a description file installation interface of the IOS apparatus; and
obtain a first input of the user on the description file installation interface, and importing the IOS description file into an IOS system of the IOS apparatus in response to the first input.

13. A non-transitory computer-readable storage medium having computer-readable program code stored therein that, in response to execution by a processor of an apparatus, cause the apparatus to perform operations comprising:
obtaining authentication information of a first wireless local area network, wherein the authentication information of the first wireless local area network comprises a service set identifier (SSID) and an access password of the first wireless local area network;
configuring the SSID of the first wireless local area network as a hidden SSID; and
sending at least one first probe request frame having at least a part of the authentication information of the first wireless local area network, wherein the first probe request frame further comprises a feature code, wherein the feature code is used by a home device to identify a terminal such that when the feature code included in the first probe request frame is different from a preset feature code, the home device discards the first probe request frame, and when the feature code included in the first probe request frame is same as the preset feature code, the home device determines that the first probe request frame is sent by the terminal.

14. The non-transitory computer-readable storage medium according to claim 13, wherein the first probe request frame is not responded to by an access point that establishes the first wireless local area network.

15. The non-transitory computer-readable storage medium according to claim 13, wherein an SSID field of the first probe request frame carries the at least a part of the authentication information of the first wireless local area network.

16. The non-transitory computer-readable storage medium according to claim 13, wherein the operations further comprise:
dividing the authentication information of the first wireless local area network into at least two parts, to obtain at least two pieces of segmental authentication information, wherein
the at least one first probe request frame comprises at least two second probe request frames, each of the at least two second probe request frames carries one of the at least two pieces of segmental authentication information respectively.

17. The non-transitory computer-readable storage medium according to claim 13, wherein the operations further comprise:
displaying a display interface of a first application, wherein the display interface of the first application comprises an authentication information entry window, wherein
the obtaining authentication information of a first wireless local area network comprises:
obtaining the authentication information of the first wireless local area network entered by a user through the authentication information entry window.

* * * * *